US010205400B2

(12) United States Patent
Afridi et al.

(10) Patent No.: US 10,205,400 B2
(45) Date of Patent: Feb. 12, 2019

(54) STACKED SWITCHED CAPACITOR ENERGY BUFFER CIRCUIT

(71) Applicant: The Regents of the University of Colorado, a body corporate, Boulder, CO (US)

(72) Inventors: Khurram K. Afridi, Boulder, CO (US); Yu Ni, Boulder, CO (US); Minjie Chen, Brighton, MA (US); Curtis Serrano, Orinda, CA (US); Benjamin Montgomery, San Diego, CA (US); David Perreault, Andover, MA (US); Saad Pervaiz, Boulder, CO (US)

(73) Assignees: The Regents of the University of Colorado, a body corporated, Denver, CO (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/853,751

(22) Filed: Sep. 14, 2015

(65) Prior Publication Data

US 2016/0079965 A1 Mar. 17, 2016

Related U.S. Application Data

(60) Provisional application No. 62/050,109, filed on Sep. 13, 2014.

(51) Int. Cl.
*H02J 7/00* (2006.01)
*H02J 7/34* (2006.01)
*H02M 7/00* (2006.01)

(52) U.S. Cl.
CPC ............. *H02M 7/00* (2013.01); *H02J 7/0024* (2013.01); *H02J 7/345* (2013.01)

(58) Field of Classification Search
CPC .. H02J 50/12; H02J 7/025; H02J 5/005; H02J 3/01; H02M 1/08; H02M 7/537;
(Continued)

(56) References Cited

U.S. PATENT DOCUMENTS 6,600,437 B1 * 7/2003 Confalonieri ........... H03M 1/68
327/554
2003/0107425 A1 6/2003 Yushan
(Continued)

FOREIGN PATENT DOCUMENTS

WO 2013109743 A2 7/2013
WO 2013109797 A1 7/2013

OTHER PUBLICATIONS

Ni et al. Energy Density Enhancement of Unipolar SSC Energy Buffers through Capacitance Ratio Optimization. IEEE workshop on Control and Modeling for Power Electronics. Jun. 22-25, 2014. Accessed via Internet: URL: https://www.researchgate.net/publication/265552627_Energy_Density_Enhancement_of_Unipolar_SSC_Energy_Buffers_though_Capacitance_Ratio_Optimization.
(Continued)

*Primary Examiner* — John W Poos
(74) *Attorney, Agent, or Firm* — Dinsmore & Shohl LLP; Thomas J. Osborne, Jr.

(57) ABSTRACT

SSC energy buffer circuit includes a switching network and a plurality of energy storage capacitors. The switching network may operate at a relatively low switching frequency and can take advantage of soft charging of the energy storage capacitors to reduce loss. Efficiency of the SSC energy buffer circuit can be extremely high compared with the efficiency of other energy buffer circuits. The SSC energy buffer architecture exhibits losses that scale with the amount of energy buffered, such that a relatively high efficiency can be achieved across a desired operating range. Improvements in SSC energy buffer circuits include, in
(Continued)

various implementations, the use of ground reference gate drive, the elimination of a separate precharge circuit through control of at least a portion of the switches of the SSC energy buffer circuit, and/or optimized ratio of capacitance values of two or more capacitors in an SSC energy buffer circuit.

21 Claims, 26 Drawing Sheets

(58) Field of Classification Search
CPC ............ H02M 1/36; H02M 1/42; H02M 1/32; H02M 3/07
USPC ........................................ 327/552, 553, 554
See application file for complete search history.

(56) References Cited

U.S. PATENT DOCUMENTS

2007/0253235 A1    11/2007  Felber
2010/0019807 A1     1/2010  Zhang et al.
2010/0073081 A1*    3/2010  Moon ................ H03H 11/1291
                                              327/554
2013/0063120 A1     3/2013  Hoellinger et al.

OTHER PUBLICATIONS

ISA/US Search Report and Written Opinion dated Feb. 5, 2015 in reference to co-pending International Application No. PCT/US2015/049863 filed Sep. 13, 2015.

* cited by examiner

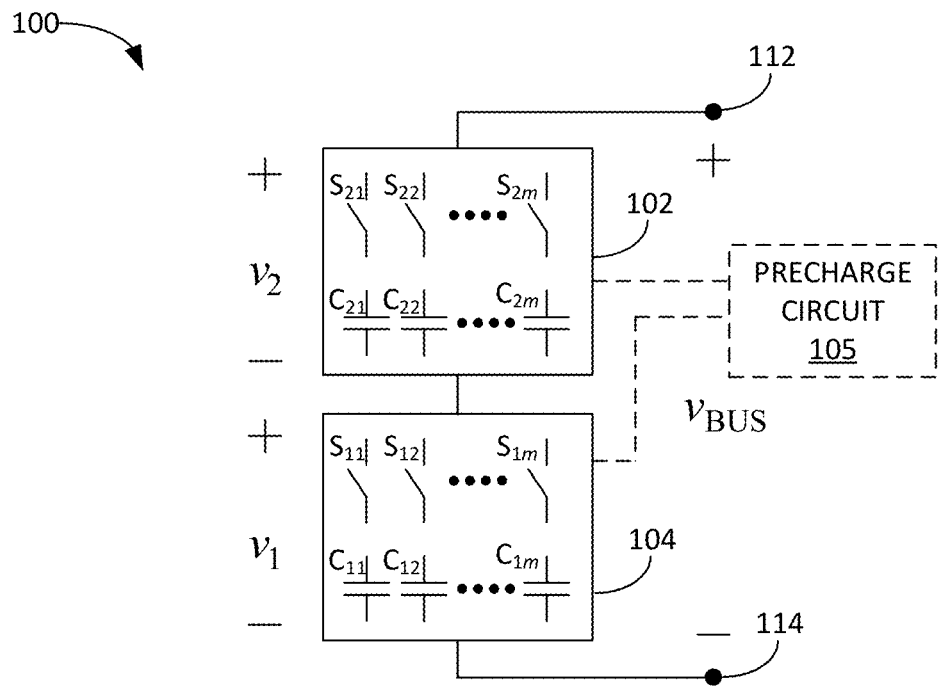
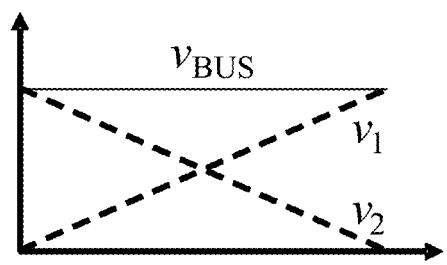
FIG. 2

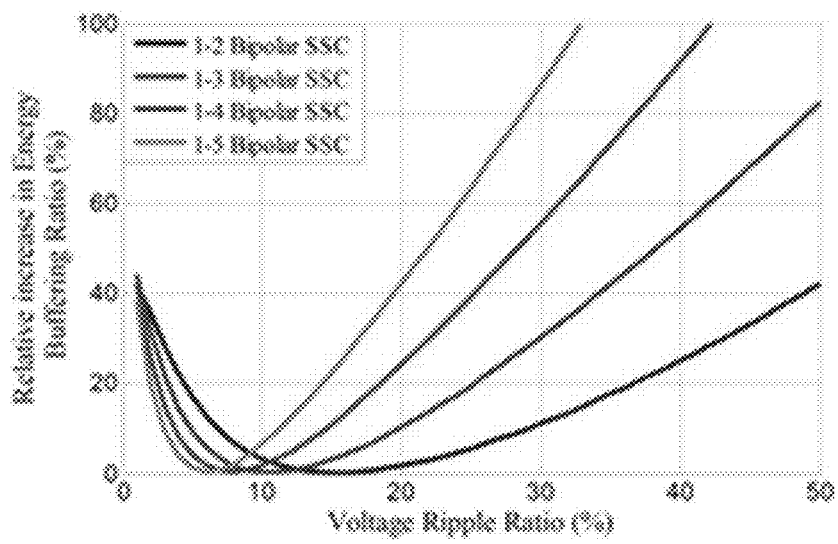
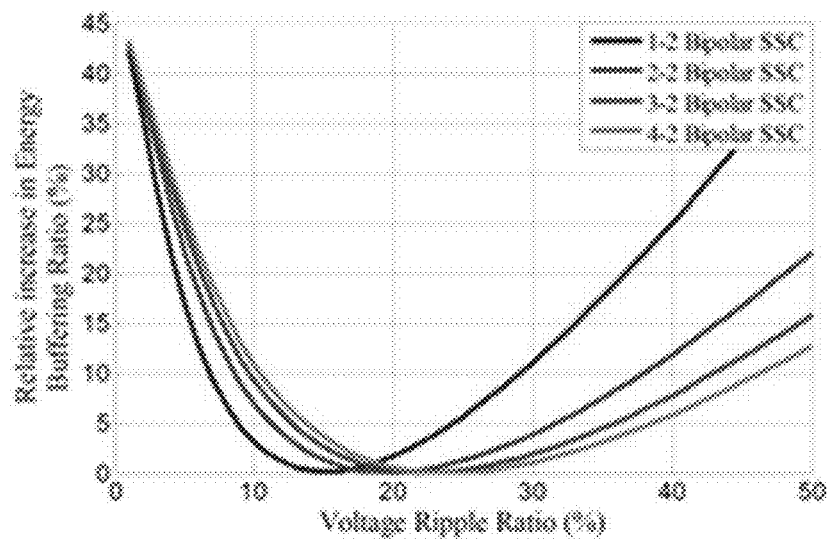
FIG. 9

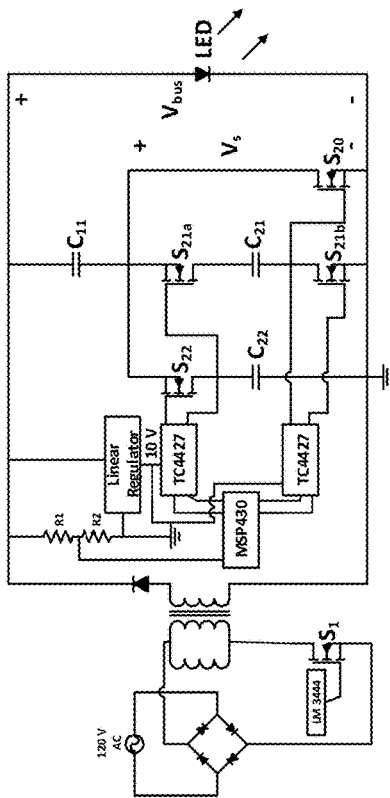

FIG. 14

Table I: Capacitor specifications for volume and energy buffering ratio optimized 1-2 enhanced unipolar SSC energy buffers.

| Capacitor | Required Linear Capacitance (µF) | Selected Ceramic Capacitance (µF) | Maximum Capacitor Voltage (V) | Minimum Capacitor Voltage (V) | Selected Voltage Rating (V) | Volume (mm³) | Passive Volume (mm³) |
|---|---|---|---|---|---|---|---|
| SSC energy buffer under energy buffering ratio optimization | $C_{11}$ | 186 | 560 | 23 | 16.6 | 35 | 516 | 649 |
| | $C_{21}$ | 952 | 1452 | 2.1 | 1.76 | 4 | 68 | |
| | $C_{22}$ | 558 | 1269 | 3.9 | 2.33 | 6 | 65 | |
| SSC energy buffer under volume optimization | $C_{11}$ | 193 | 580 | 22.05 | 16.95 | 35 | 535 | 637 |
| | $C_{21}$ | 665 | 1012 | 2.1 | 1.5 | 4 | 47 | |
| | $C_{22}$ | 483 | 1081 | 3.6 | 3.13 | 6 | 55 | |

FIG. 15

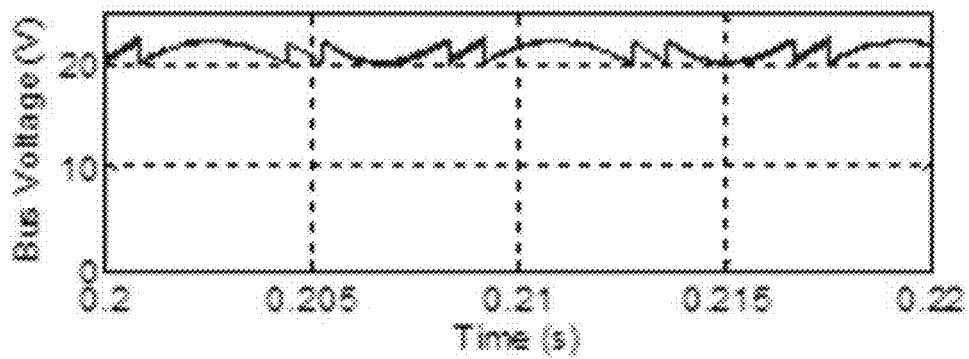
FIG. 16
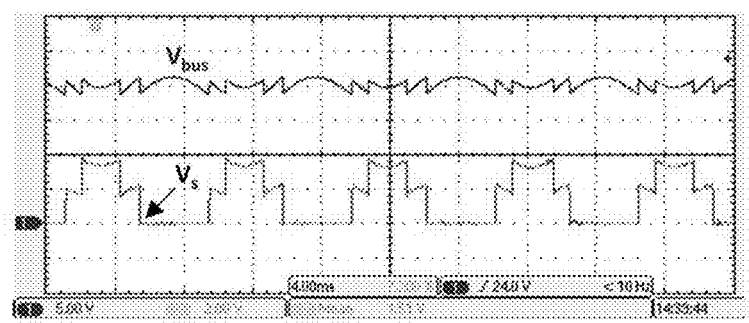
(a)
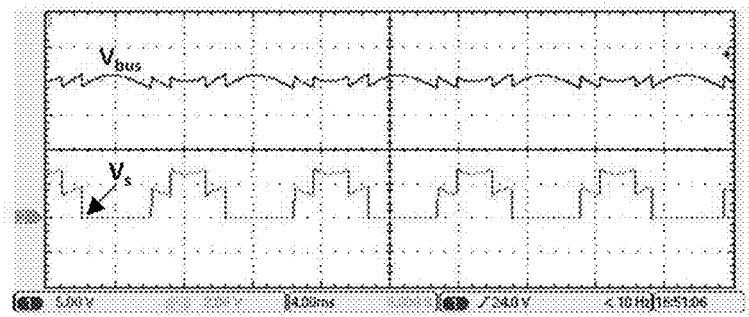
(b)
FIG. 17

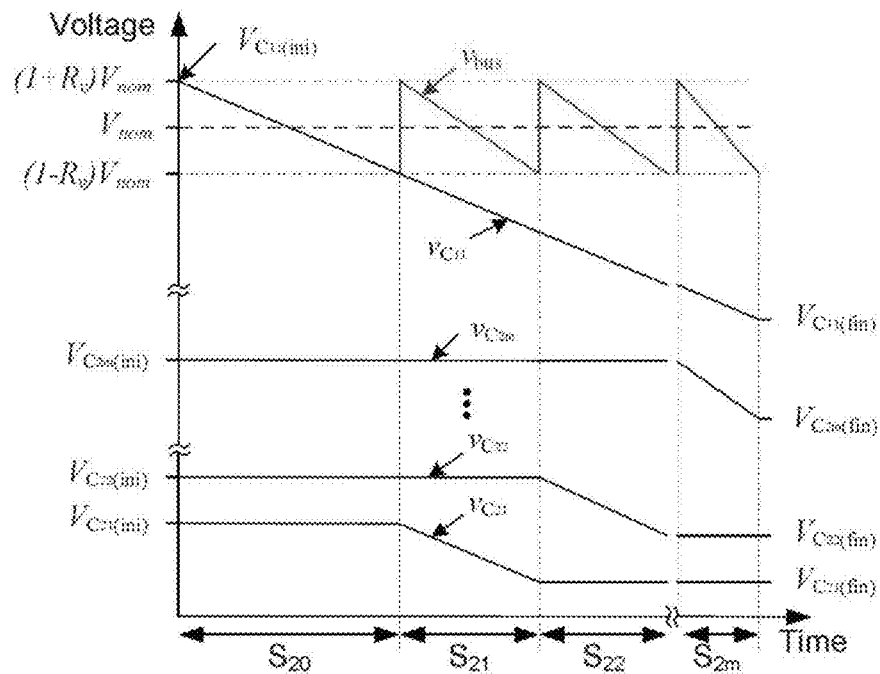

FIG. 20

$$\Gamma_b = 1 - \frac{4\left[\alpha_{21}\left(\frac{\alpha_{21}}{\alpha_{21}+1}\right)^2 + \cdots + \alpha_{2k}(\sum_{j=1}^{k}\frac{\alpha_{2j}}{\alpha_{2j}+1})^2 + \cdots + \alpha_{2m}(\sum_{j=1}^{m}\frac{\alpha_{2j}}{\alpha_{2j}+1})^2\right]R_0^2 + \left[1-(1+2\sum_{j=1}^{m}\frac{\alpha_{2j}}{\alpha_{2j}+1})R_v\right]^2}{4\left[\alpha_{21} + \cdots + \alpha_{2k}(1+\sum_{j=2}^{k}\frac{\alpha_{2j-1}}{\alpha_{2j-1}+1})^2 + \cdots + \alpha_{2m}(1+\sum_{j=2}^{m}\frac{\alpha_{2j-1}}{\alpha_{2j-1}+1})^2\right]R_0^2 + (1+R_v)^2}$$

FIG. 21

Table II
PASSIVE VOLUME OF THE 1-2 ENHANCED UNIPOLAR SSC ENERGY BUFFER WITH OPTIMIZED CAPACITANCE RATIOS VERSUS ONE WITH EQUAL CAPACITANCE VALUES.

| | Capacitor | Required Linear Capacitance ($\mu F$) | Selected Ceramic Capacitance ($\mu F$) | Required Voltage Rating (V) | Selected Voltage Rating (V) | Volume ($mm^3$) | Passive Volume ($mm^3$) |
|---|---|---|---|---|---|---|---|
| SSC energy buffer with equal capacitance values | $C_{11}$ | 240 | 720 | 2.3 | 35 | 664 | 710 |
| | $C_{21}$ | 240 | 974 | 2.1 | 4 | 17 | |
| | $C_{22}$ | 240 | 564 | 3.2 | 6 | 29 | |
| SSC energy buffer with optimal capacitance values | $C_{11}$ | 186 | 560 | 2.3 | 35 | 516 | 649 |
| | $C_{21}$ | 952 | 1452 | 2.1 | 4 | 68 | |
| | $C_{22}$ | 558 | 1269 | 3.9 | 6 | 65 | |

FIG. 26

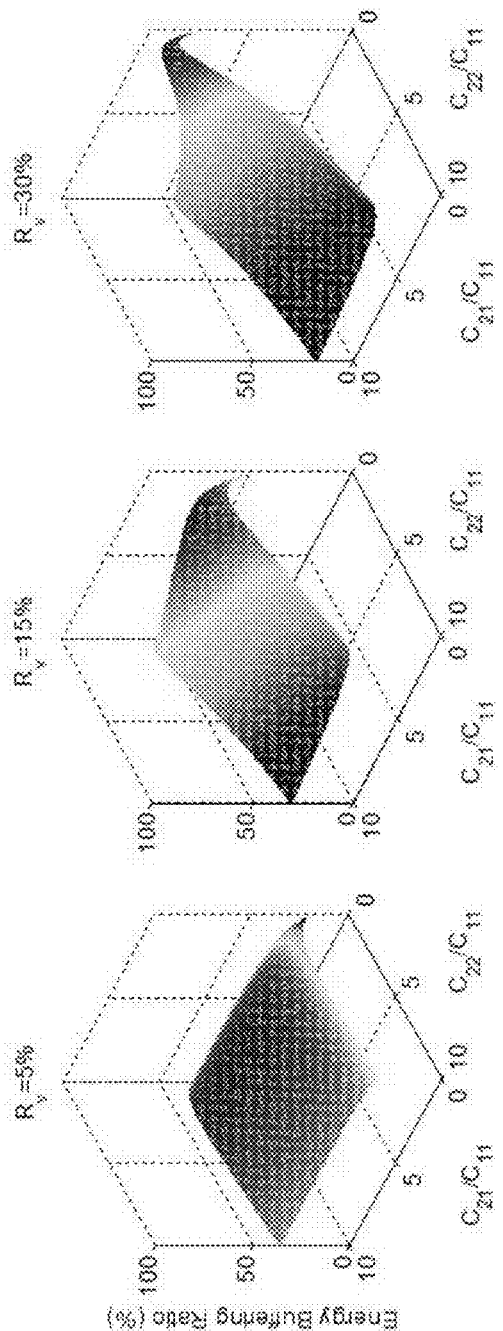

FIG. 31

TABLE 1
CAPACITANCE VALUES AND VOLTAGE RATINGS OF THE CAPACITORS NEEDED IN AN 8-W 24-V OUTPUT OFFLINE LED DRIVER WITH THREE DIFFERENT TYPES OF ENERGY BUFFERS: AN SSC ENERGY BUFFER WITH OPTIMAL CAPACITANCE RATIOS, AN SSC ENERGY BUFFER WITH EQUAL CAPACITANCES, AND A SINGLE-CAPACITOR ENERGY BUFFER. THE TOTAL ENERGY STORED IN THE ENERGY BUFFERS IS ALSO INDICATED.

| | SSC Energy Buffer | | Single Capacitor |
|---|---|---|---|
| | Optimal Capacitance Ratio | Equal Capacitance | Single Capacitance |
| $C_{11}$ | 22 V, 195 µF | 22 V, 253 µF | 22V, 505 µF |
| $C_{21}$ | 2.0 V, 1100 µF | 2 V, 253 µF | |
| $C_{22}$ | 3.7 V, 573 µF | 3 V, 253 µF | |
| $E_{total}$ | 0.0532 J | 0.0628 J | 0.1223 J |

FIG. 34

STACKED SWITCHED CAPACITOR ENERGY BUFFER CIRCUIT

CROSS-REFERENCE TO RELATED APPLICATIONS

This application claims the benefit of U.S. provisional application No. 62/050,109, filed 13 Sep. 2014, which is hereby incorporated by reference including any appendices filed therewith as though fully set forth herein.

This application is related to PCT applications PCT/US13/21926 and US publication 2014/0313781 A1 "STACKED SWITCHED CAPACITOR ENERGY BUFFER CIRCUIT ARCHITECTURE", PCT/US13/22001 and US publication 2014/0167513 A1 entitled "ENHANCED STACKED SWITCHED CAPACITOR ENERGY BUFFER CIRCUIT" and PCT/US13/24552 and US publication 2014/0167513 A1 entitled "SYSTEMS APPROACH TO PHOTOVOLTAIC ENERGY EXTRACTION," each of which is hereby incorporated by reference as though fully set forth herein.

BACKGROUND a. Field

The instant invention relates to stacked switched capacitor (SSC) energy buffers.

b. Background

Power conversion systems that interface between direct current (DC) and single-phase alternating current (AC) require an energy storage capability (or an energy buffer) that provides buffering between a constant power desired by a DC source or a load and a continuously varying power desired for a single-phase AC system.

The flow to and from such an energy buffer is at twice the line frequency (e.g., 120 Hz in the United States). The buffering energy requirement can be calculated as $P/\omega_{line}$, where P is the system average power and $\omega_{line}$ is the line angular frequency. Because the energy storage requirement of the buffer is proportional to the system average power and the (relatively long) line period ($T_{line}=2\pi/\omega_{line}$), the size of the required energy buffer cannot be reduced simply through increases in switching frequency of an interface power converter. Thus, energy buffering requirements represent a significant limitation on miniaturization of grid interface systems.

One consideration associated with twice-line-frequency energy buffering relates to lifetime and reliability. Conventional power conversion systems typically utilize electrolytic capacitors to provide high-density energy storage for buffering. It is, however, widely appreciated that despite providing the best available energy density and providing small DC bus voltage variation, electrolytic capacitors also represent a significant source of system lifetime and reliability problems. Also, electrolytic capacitors can only be operated over a narrow charge/discharge range at 120 Hz for thermal and efficiency reasons (i.e., associated with RMS current limits and efficiency requirements). These considerations directly limit the energy buffering capability of electrolytic capacitors at 120 Hz. Thus, while typical peak energy storage densities of up to 0.9 J/cm³ can be achieved with electrolytic capacitors, the allowable energy swing at 120 Hz yields practical energy densities that are about an order of magnitude lower. Hence, the development of energy buffering circuits that eliminate electrolytic capacitors while maintaining high energy storage density and high efficiency is one important requirement to achieving future grid interface systems that have both a small size and a high reliability.

Film and ceramic capacitors have much longer lifetime, but lower energy density. To compensate for their lower energy density, film and ceramic capacitors can be charged and discharged over a wider voltage range than is practical with electrolytic capacitors at relatively high frequencies, provided a mechanism is available to maintain the dc bus voltage within a required narrow range. A number of strategies to increase the energy utilization of capacitors have been proposed, including the use of an additional bidirectional dc-dc converter, an energy buffer incorporated into the power stage and switched capacitor energy buffers.

BRIEF SUMMARY

In various implementations, a stacked switched capacitor (SSC) energy buffer circuit includes a switching network and a plurality of energy storage capacitors. The switching network need operate at only a relatively low switching frequency and can take advantage of soft charging of the energy storage capacitors to reduce loss. Thus, efficiency of the SSC energy buffer circuit can be extremely high compared with the efficiency of other energy buffer circuits. Since circuits utilizing the SSC energy buffer architecture need not utilize electrolytic capacitors, circuits utilizing the SSC energy buffer architecture overcome limitations of energy buffers utilizing electrolytic capacitors. Circuits utilizing the SSC energy buffer architecture (without electrolytic capacitors) can achieve an effective energy density characteristic comparable to energy buffers utilizing electrolytic capacitors. The SSC energy buffer architecture exhibits losses that scale with the amount of energy buffered, such that a relatively high efficiency can be achieved across a desired operating range.

In various implementations, improvements in SSC energy buffer circuits include use of a ground reference gate drive, elimination of a separate precharge circuit through control of at least a portion of the switches of the SSC energy buffer circuit, and/or optimized ratio of capacitance values of two or more capacitors in an SSC energy buffer circuit.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 2 depicts an example implementation of a stacked switched capacitor (SSC) energy buffer circuit according to one or more implementations.

FIG. 9 depicts an example representation of a relative increase in energy buffering ratio due to capacitance ratio optimization for a number of enhanced bipolar SSC energy buffers according to one or more implementations.

FIG. 14 depicts an example prototype circuit of an SSC energy buffer circuit according to one or more implementations.

FIG. 15 depicts example capacitor specifications for volume and energy buffering ratio optimized 1-2 enhanced unipolar SSC energy buffers identified as Table I according to one or more implementations.

FIG. 16 depicts example simulated dc bus voltage waveforms for two 1-2 enhanced unipolar SSC energy buffers: (a) energy buffering ratio optimized, and (b) volume optimized according to one or more implementations.

FIG. 17 depicts an example experimental dc bus voltage and supporting block voltage waveforms for two prototyped 1-2 enhanced unipolar SSC energy buffer: (a) energy buffering ratio optimized, and (b) volume optimized according to one or more implementations.

FIG. 20 depicts example voltage waveforms for a 1-m enhanced unipolar SSC energy buffer with arbitrary capacitance values, when it is discharged by a constant current during normal operation, according to one or more implementations.

FIG. 21 depicts an example expression for an energy buffering ratio of a 1-m enhanced unipolar SSC energy buffer with capacitors of unequal capacitance values according to one or more implementations.

FIG. 26 depicts example passive volume of a 1-2 enhanced unipolar SSC energy buffer circuit with optimized capacitance ratios versus one with equal capacitance values identified as Table II according to one or more implementations.

FIG. 31 depicts an example graph plotting an energy buffering ratio of a 1-2 enhanced unipolar SSC energy buffer according to one or more implementations.

FIG. 34 depicts an example table showing optimized capacitance ratios for example ripple ratios and is identified as Table III.

DESCRIPTION

A switched capacitor structure referred to herein as stacked switched capacitor (SSC) circuit is provided. In one implementation, for example, an SSC energy buffer circuit is provided. Although reference is sometimes made herein to use of an energy buffer circuit in a particular application, it should be appreciated that the energy buffer circuits, concepts and techniques described herein find use in a wide variety of applications. For example, many applications exist in which an energy buffer is used because either a peak power rating or a desired energy transfer rating of a first source or load is different from that of the source or load to which it interfaces. It should be recognized that the concepts, systems, circuits and techniques described herein can be used in these applications to achieve one or more of: higher energy density/smaller size at a given voltage variation level, higher reliability by using more desirable energy storage elements.

A Stacked Switched Capacitor (SSC) energy buffer architecture has the least complexity amongst the switched capacitor approaches and also partially overcomes the efficiency and flexibility limitations associated with the other techniques. Film and ceramic capacitors have a reliability and lifetime which is higher than electrolytic capacitors, but it is also known that film and ceramic capacitors have considerably lower peak energy density than electrolytic capacitors (up to an order of magnitude).

The SSC energy buffer circuit provides a small variation of a bus voltage, $V_{bus}$ while also providing high utilization of available peak energy storage capacity. In one implementation, as described in United States patent application publication number US2014/0355322 entitled "Stacked Switched Capacitor Energy Buffer Circuit" filed on Jan. 17, 2013 from PCT patent application number PCT/US2013/021886, which is incorporated herein by reference as if fully set forth herein, for example, a variation of 12.5% or less is provided while providing utilization of available peak energy storage capacity of 72.7% or better. The example SSC energy buffer circuit and related techniques described herein achieves extremely high efficiency (e.g., by using film capacitors) and uses simpler circuitry. The SSC energy buffer circuit and related techniques described herein achieves extremely high energy density e.g., by incorporating film capacitors, electrolytic capacitors or ultracapacitors and employing them over a wider voltage range than appears at the input port. The SSC energy buffer circuit and related techniques described herein provide performance characteristics comparable to or better than conventional energy buffer circuits while at the same time utilizing fewer switches and capacitors than conventional energy buffer circuits. Thus, the example SSC energy buffer circuit may include a number of variations as will be described herein.

Figure 1A:
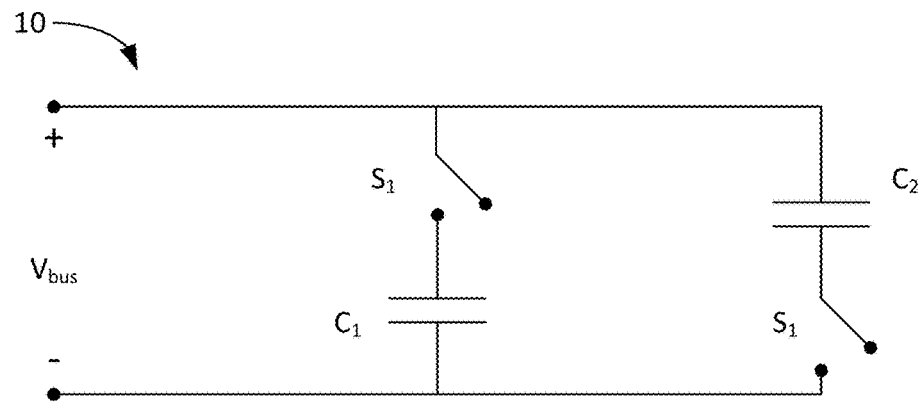
FIG. 1A depicts an example switched capacitor circuit that reconfigures capacitors between parallel and series combinations according to one or more implementations.
Figure 1B:
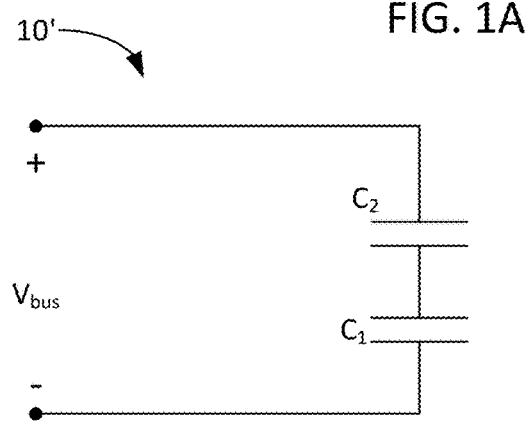
FIG. 1B depicts an example equivalent circuit of the switched capacitor circuit shown in FIG. 1A for an example switch configuration according to one or more implementations.
Figure 1C:
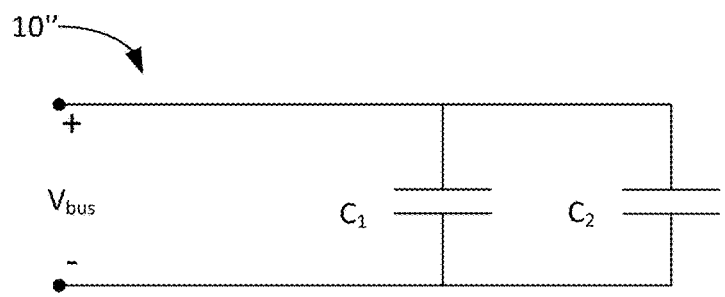
FIG. 1C depicts another example equivalent circuit of the switched capacitor circuit shown in FIG. 1A for an example switch configuration according to one or more implementations.

Referring to FIGS. 1A to 1C, switched capacitor circuits that reconfigure capacitors between parallel and series combinations have been used to improve the energy utilization of ultracapacitors. In FIG. 1A, a circuit 10 is a simple version of a parallel-series switched capacitor circuit. The circuit 10 includes switches $S_1$, $S_2$, $S_3$ and two capacitors $C_1$ and $C_2$. The circuit 10 also includes a terminal 12 and a terminal 14 (collectively referred to herein as a buffer port) to provide a bus voltage, $V_{bus}$, across the terminals 12, 14. When switches $S_1$ and $S_3$ are open and $S_2$ is closed, the resulting configuration is represented by a circuit 10' as shown in FIG. 1B depicting capacitors $C_1$ and $C_2$ in series. When switches $S_1$ and $S_3$ are closed and $S_2$ is open, the resulting configuration is represented by a circuit 10" shown in FIG. 1C depicting capacitors $C_1$ and $C_2$ in parallel.

While the circuit 10 has relatively high capacitor energy utilization, the circuit 10 also has a relatively high voltage ripple ratio of 33.3%. That is, the value of the bus voltage, $V_{bus}$, varies by as much as 33.3%. For example, in one embodiment, the voltage of the dc bus varies from $0.67V_{nom}$ to $1.33V_{nom}$ where $V_{nom}$ is the average (nominal) value of the bus voltage. More complex parallel-series switched capacitor circuits have also been developed which achieve a better voltage ripple ratio; however, these complex parallel-series switched capacitors have high circuit complexity when high energy utilization and small voltage ripple are required. For example, a circuit currently having among the best performance (e.g., a 8-6-5-4-3 parallel-series switched capacitor circuit) has an energy utilization of 92.09% and a voltage ripple ratio of 14.3%, but requires 41 switches and 120 capacitors making the circuit relatively complicated and thus relatively difficult to implement for use in practical circuits and systems.

Referring to FIG. 2, an example implementation of a stacked switched capacitor (SSC) energy buffer circuit 100 is provided that overcomes the deficiencies of the switched capacitor circuits like that of the circuit 10 (FIG. 1A). The SSC energy buffer circuit 100 includes a first set of circuitry 102 and a second set of circuitry 104 connected in series. In this implementation, the SSC energy buffer circuit 100 further includes a pre-charge circuit 105, although in other implementations described herein, the pre-charge circuit 105 may be omitted. The pre-charge circuit 105, in this particular implementation, is coupled to each of the two sub-circuits 102, 104 and the pre-charge circuit 105 is operable to charge each of one or more capacitors in two sub-circuits 102, 104 to specified initial conditions before entering a first operating mode. In some cases, the pre-charge circuit 105 may be coupled in series with each of the two sub-circuits 102, 104 before entering a first operating mode, and further connections of the pre-charge circuit 105 to capacitors within the two sub-circuits 102, 104 may be made with switches in the two sub-circuits 102, 104.

The circuit 100 also includes a terminal 112, a terminal 113 and a terminal 114. Terminals 112, 114 collectively form a buffer port to provide the bus voltage, $V_{BUS}$. Each set of circuitry 102, 104 includes capacitors.

As illustrated in FIG. 2, the first set of circuitry 102 includes capacitors $C_{11}, C_{12}, \ldots, C_{1n}$ and the second set of circuitry 104 includes capacitors $C_{21}, C_{22}, \ldots, C_{2m}$ where n and m are integers greater than or equal to one. The capacitors $C_{11}, C_{12}, \ldots, C_{1n}, C_{21}, C_{22}, \ldots, C_{2m}$, are of a type that can be efficiently charged and discharged over a wide voltage range (e.g., film capacitors electrolytic capacitors and ultracapacitors).

Each set of circuitry also includes switches. As illustrated in FIG. 2, the first set of circuitry 102 includes switches $S_{11}$, $S_{12}, \ldots, S_{1n}$ and the second set of circuitry 104 includes switches $S_{21}, S_{22}, \ldots, S_{2m}$ connected in series with a respective one capacitor. For example, the switch $S_{11}$ is in series with the capacitor $C_{11}$, the switch $S_{12}$ is in series with the capacitor $C_{12}$, the switch $S_{21}$ is in series with the capacitor $C_{21}$, the switch $S_{22}$ is in series with the capacitor $C_{22}$ and so forth. The switches $S_{11}, S_{12}, \ldots, S_{1m}$ and $S_{21}, S_{22}, \ldots, S_{2n}$ enable dynamic reconfiguration of both the interconnection among the capacitors and their connection to the buffer port to provide the bus voltage, $V_{bus}$.

It should, of course, be appreciated that in some implementations there is no one-to-one correspondence between capacitors and switches, that is, a "leg" can be just a capacitor, just a switch or a switch in series with a capacitor as in many cases. Also one of the blocks can have switches not associated with a "leg" to allow the "legs" of that block to be connected in reverse.

The switching in the circuit 100 (i.e., opening and closing of the switches) may be performed such that the voltage seen at the buffer port, $V_{bus}$, varies only over a small range as the capacitors charge and discharge over a wide voltage range to buffer energy, thereby providing a high effective energy density. By appropriately modifying the switch states, the buffer capacitors absorb and deliver energy over a relatively wide individual voltage range, while maintaining a relatively narrow-range voltage at the input port. This enables a high degree of utilization (and in some cases, even maximal utilization) of the capacitor energy storage capability. Efficiency of the circuit 100 can be extremely high because the switches in the circuit 100 need operate at only very low (line-scale) switching frequencies. Also, the circuit 100 can take advantage of soft charging of the energy storage capacitors to reduce loss. Moreover, the circuit 100 exhibits losses that reduce as energy buffering requirements reduce such that high efficiency can be achieved across the full operating range.

Figure 3:
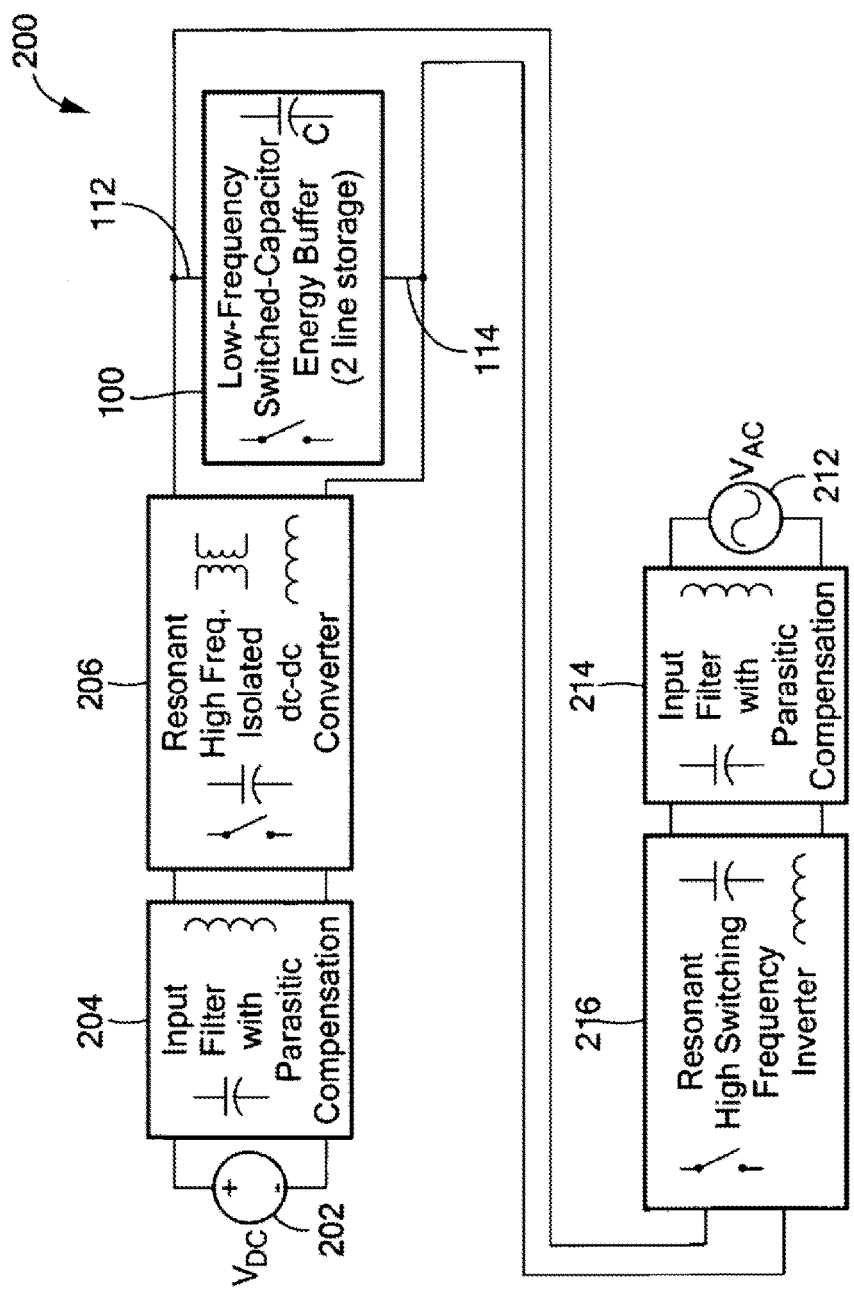
FIG. 3 depicts an example SSC energy buffer circuit that may be included into a grid interface power converter system according to one or more implementations.

Referring to FIG. 3, the SSC energy buffer circuit 100 may be included into a grid interface power converter system 200. The system 200 includes a DC power source 202 coupled to an input filter with parasitic compensation 204, a resonant high frequency isolated DC-DC converter 206 coupled to the SSC energy buffer circuit 100 through the terminals 112, 114 that provide the bus voltage, $V_{bus}$. The system 200 also includes an AC power source 212 coupled to an input filter with parasitic compensation 214, a resonant high frequency inverter 216 coupled to the SSC energy buffer circuit 100 through the terminals 112, 114. This energy buffering approach is applicable to a wide range of grid-interface power electronic applications (including photovoltaic inverters, motor drives, power supplies, off-line LED drivers and plug-in hybrid electric vehicle chargers and so forth), enabling improved reliability and lifetime in these applications.

Figure 3A:
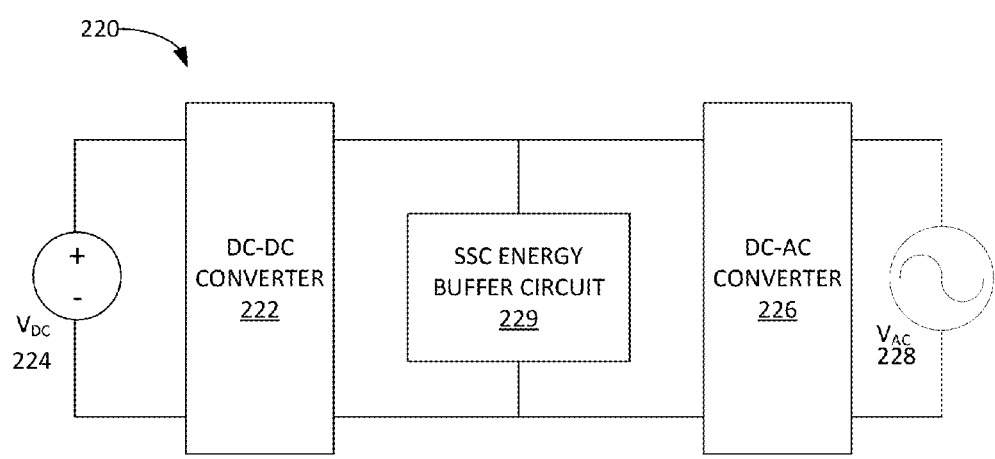
FIG. 3A depicts an example implementation of a grid interface power converter that includes an SSC energy storage circuit according to one or more implementations.

Referring to FIG. 3A, a grid interface power converter 220 includes a DC-DC converter 222 having a first port adapted to connect to a DC source or load 224. The grid interface power converter 220 further includes a DC-AC converter 226 having a first port coupled to a second port of the DC-DC converter 222 and having a second port adapted to connect to an AC source or load 228. The grid interface power converter 220 further comprises a stacked switched capacitor (SSC) energy buffer circuit 229 coupled between the second port of the DC-DC converter 222 and the first port of the DC-AC converter 226. By appropriately modifying switch states of the SSC energy buffer circuit, the SSC energy buffer circuit absorbs and delivers energy over a wide individual capacitor voltage range, while maintaining a narrow-range voltage at the input port. This enables relatively high utilization, and in some cases maximal utilization, of the energy storage capability.

A number of different SSC energy buffer topologies have been introduced, including unipolar and bipolar variants. Unipolar SSC energy buffer circuits, for example, include both standard unipolar SSC energy buffer circuits (1-1, 1-2, . . . 1-∞) and enhanced unipolar SSC energy buffer circuits (1-1, 1-2, . . . 1-∞). Similarly, bipolar SSC energy buffer circuits include both standard bipolar SSC energy buffer circuits (1-1 . . . ∞-∞) and enhanced bipolar SSC energy buffer circuits (1-1 . . . ∞-∞).

The SSC energy buffer circuits proposed thus far use capacitors with equal capacitance value.

In one implementation described herein, an SSC energy buffer is provided with an optimized ratio of capacitance values of at least two capacitors in an SSC energy buffer circuit. In one particular implementation, for example, the energy density of an SSC energy buffer circuit is enhanced by optimizing a capacitance ratio of each capacitor used in the energy buffer. Methods of optimizing a ratio of capacitance values of at least two capacitors in an SSC energy buffer circuit are also provided. As used herein, the term optimizing need not provide an ultimate highest relative performance, but may be used to increase the performance of the SSC energy buffer circuit over one in which equal value capacitance levels are used for the capacitors of the SSC energy buffer circuits.

This methodology is applicable to all classes of the SSC energy buffer (standard unipolar SSC energy buffer circuits, enhanced unipolar SSC energy buffer circuits, standard bipolar SSC energy buffer circuits and enhanced bipolar SSC energy buffer circuits).

An SSC energy buffer comprises two series-connected blocks of circuitry (referred to as backbone and supporting blocks of circuitry) of switches and capacitors. The SSC energy buffer works on the principle that while the voltage across each block and each individual capacitor is allowed to vary across a wide range, the variations in voltages across the two blocks compensate for each other, resulting in a narrow range dc-bus voltage. In a unipolar design, the supporting block capacitors can only connect in series with the backbone block capacitor. However, in a bipolar design the supporting block capacitors can switch between a series and an anti-series connection with the backbone block capacitor(s). Both unipolar and bipolar SSC energy buffers have enhanced variants; these improve performance in the case of the unipolar design by adding one switch, and in the bipolar design by simply modifying its control.

Bipolar

Figure 4A:
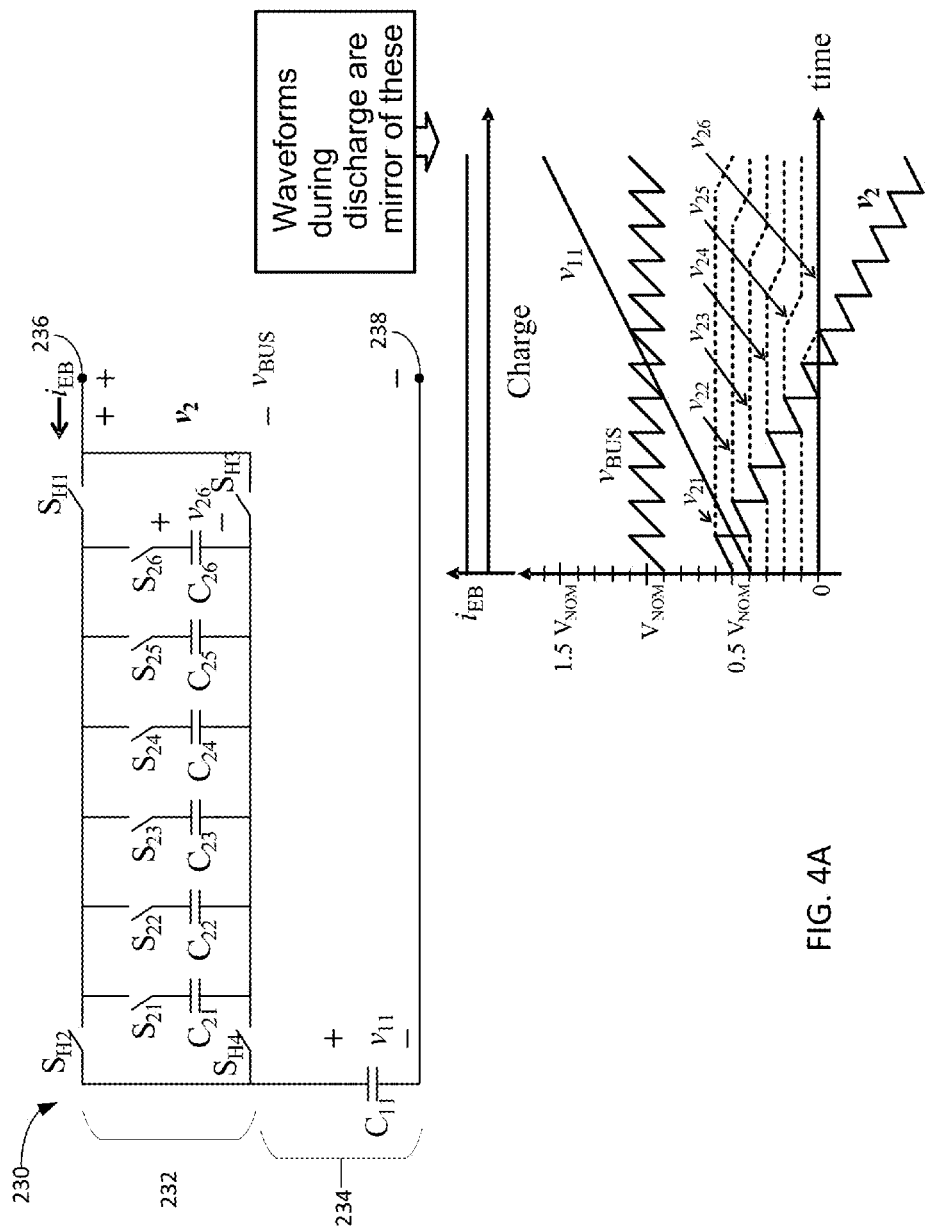
FIG. 4A depicts an example implementation of a bipolar SSC energy buffer circuit according to one or more implementations.

Referring to FIG. 4A, one particular example of an SSC energy buffer circuit 100 is a circuit 230 called a bipolar SSC energy buffer circuit. In this example, the bipolar energy buffer circuit 230 includes a first set of circuitry 232 and a second set of circuitry 234 in series with the first set of circuitry 232. The first set of circuitry, in this example, includes six "legs" each of which comprise one of six switches $S_{21}, S_{22}, S_{23}, S_{24}, S_{25}, S_{26}$ series coupled with respective ones of six capacitors $C_{21}, C_{22}, C_{23}, C_{24}, C_{25}, C_{26}$ (e.g., the switch $S_{21}$ is in series with the capacitor $C_{21}$, the switch $S_{22}$ is in series with the capacitor $C_{22}$, the switch $S_{23}$ is in series with the capacitor $C_{23}$, and the switch $S_{24}$ is in series with the capacitor $C_{24}$ and so forth). The capacitors $C_{21}, C_{22}, C_{23}, C_{24}, C_{25}, C_{26}$ can be in the circuit 230 in a positive or a negative manner (hence the term "bipolar").

In this particular implementation, the first set of circuitry 232 also includes switches $S_{h1}$, $S_{h2}$, $S_{h3}$, $S_{h4}$ (sometimes referred herein collectively as an H-bridge) and selectively opening and closing the switches allows for bi-polar charging. The second set of circuitry 234 includes one backbone capacitor $C_{11}$. Although not shown in this particular implementation, the second set of circuitry may also include a switch $S_{11}$ serially coupled to the backbone capacitors $C_{11}$ (see, e.g., FIG. 4B). The circuit 230 also includes a terminal 236 and a terminal 238 that collectively form a buffer port to provide the bus voltage, $V_{bus}$.

The capacitors $C_{11}$, $C_{21}$, $C_{22}$, $C_{23}$, $C_{24}$, $C_{25}$, $C_{26}$ have corresponding voltages $V_{11}$, $V_{21}$, $V_{22}$, $V_{23}$, $V_{24}$, $V_{23}$, $V_{24}$, respectively. In one implementation, the capacitors $C_{11}$, $C_{21}$, $C_{22}$, $C_{23}$, $C_{24}$, $C_{25}$, $C_{26}$ may have identical capacitance, but different voltage ratings, or may have optimized capacitance levels as described in more detail below. For example when the capacitors have equal capacitance, the capacitors, $C_{11}$, $C_{12}$ may each have a voltage rating of 13/8 $V_{nom}$, where $V_{nom}$ is the nominal value of the bus voltage, $V_{bus}$. The voltage rating of the capacitors $C_{21}$, $C_{22}$, $C_{23}$, $C_{24}$ in this particular implementation may be 5/8 $V_{nom}$, 4/8 $V_{nom}$, 3/8 $V_{nom}$, and 2/8 $V_{nom}$, respectively. Pre-charging circuitry (not shown in FIG. 4) may be adapted to ensure that the following initial voltages $V_{11}$, $V_{12}$, $V_{21}$, $V_{22}$, $V_{23}$, $V_{24}$ for the capacitors $C_{11}$, $C_{12}$, $C_{21}$, $C_{22}$, $C_{23}$, $C_{24}$ are 3/8 $V_{nom}$, 3/8 $V_{nom}$, 4/8 $V_{nom}$, 3/8 $V_{nom}$, 2/8 $V_{nom}$, and 1/8 $V_{nom}$, respectively, in an implementation in which the capacitors have equal capacitances. In one example implementation where capacitance ratios are optimized/improved, the initial voltage levels for the bipolar SSC energy buffer circuit may have voltages such as, but not limited to, the initial voltage levels described below with reference to equations (7) to (13).

In this implementation, each of the capacitors $C_{11}$, $C_{21}$, $C_{22}$, $C_{23}$, $C_{24}$, $C_{25}$, $C_{26}$ are pre-charged to a predetermined initial voltage level and the backbone capacitor $C_{11}$ is charged and discharged in series and anti-series with one supporting capacitor $C_{11}$, $C_{21}$, $C_{22}$, $C_{23}$, $C_{24}$, $C_{25}$, $C_{26}$. A bus voltage ripple in this particular implementation is only ±10% while the backbone capacitor voltage ripple is ±60%. Switching can be performed at relatively low multiples of line frequency so the overall SSC energy buffer circuit 100 operation can be very efficient.

FIG. 4A also shows example waveforms of components of the circuit 230 during a charge cycle of the circuit 230. Waveforms of the components during a discharge cycle would be mirror images of the charge waveforms.

Figure 4B:
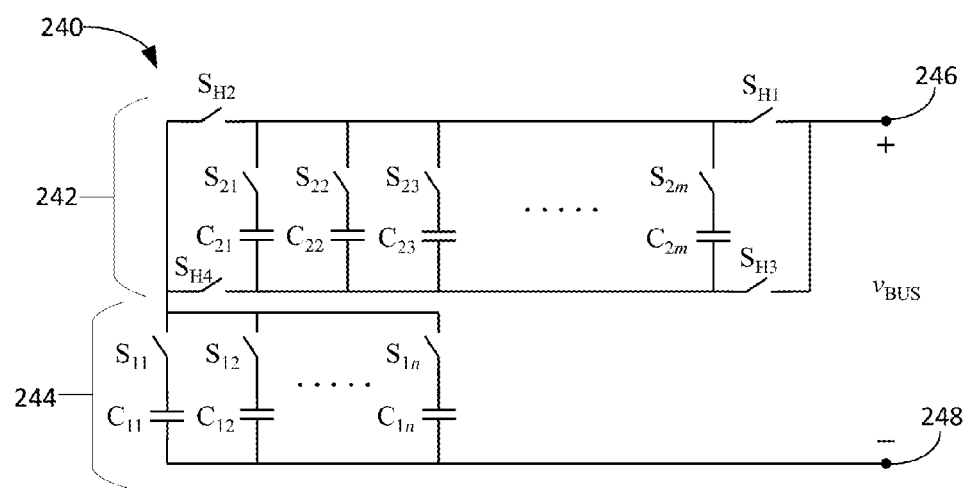
FIG. 4B depicts an example implementation of an n-m bipolar SSC energy buffer circuit 240 according to one or more implementations.

FIG. 4B shows an example implementation of an n-m bipolar SSC energy buffer circuit 240. This SSC energy buffer has n backbone capacitors ($C_{11}$ to $C_{1n}$), m supporting capacitors ($C_{21}$ to $C_{2m}$) and (n+m+4) switches, and is referred to as an n-m design. The capacitors have different voltage ratings and, in some implementations, are pre-charged to appropriate voltage levels through a specific pre-charge sequence before energy buffer starts normal operation. However, as described herein, a separate pre-charge circuit may be omitted in some implementations such as where the main power stage switches are adapted to achieve pre-charge through a specific pre-charge sequence.

In the example n-m bipolar SSC energy buffer circuit 300 shown in FIG. 4B, the circuit 240 includes a first set of circuitry 242 and a second set of circuitry 244 in series with the first set of circuitry 242. The first set of circuitry 242 includes m "legs" each of which comprises a switch $S_{21}$, $S_{22}$, $S_{23}$, ... $S_{2m}$ series coupled with respective ones of m capacitors $C_{21}$, $C_{22}$, $C_{23}$, ... $C_{2m}$ (e.g., the switch $S_{21}$ is in series with the capacitor $C_{21}$, the switch $S_{22}$ is in series with the capacitor $C_{22}$, the switch $S_{23}$ is in series with the capacitor $C_{23}$, and the switch $S_{24}$ is in series with the capacitor $C_{24}$ and so forth). The capacitors $C_{21}$, $C_{22}$, $C_{23}$, ... $C_{2m}$ can be in the circuit 240 in a positive or a negative manner (hence the term "bipolar").

The first circuitry 242 also includes switches $S_{h1}$, $S_{h2}$, $S_{h3}$, $S_{h4}$ (sometimes referred to collectively as an H-bridge) and selectively opening and closing the switches allows for bi-polar charging. The second set of circuitry 244 includes n capacitors $C_{11}$, $C_{12}$, $C_{23}$, ... $C_{2n}$ and n switches $S_{11}$, $S_{12}$, $S_{23}$, ... $S_{2n}$ serially coupled to a respective one of the n capacitors $C_{11}$, $C_{12}$, $C_{23}$, ... $C_{2n}$ (e.g., the switch $S_{11}$ is in series with the capacitor $C_{11}$ and the switch $S_{12}$ is in series with the capacitor $C_{12}$ and so forth). The circuit 240 also includes a terminal 246 and a terminal 248 that collectively form a buffer port to provide the bus voltage, $V_{bus}$.

During normal operation, in a basic version, one supporting capacitor is connected in series or anti-series with one backbone capacitor at a time as the SSC energy buffer charges and discharges. Additional switch states are introduced in an enhanced version which bypass all supporting capacitors and directly connect the backbone capacitor(s) across the dc bus. Enhanced SSC energy buffers have higher effective energy density than the basic designs.

Figure 4C:
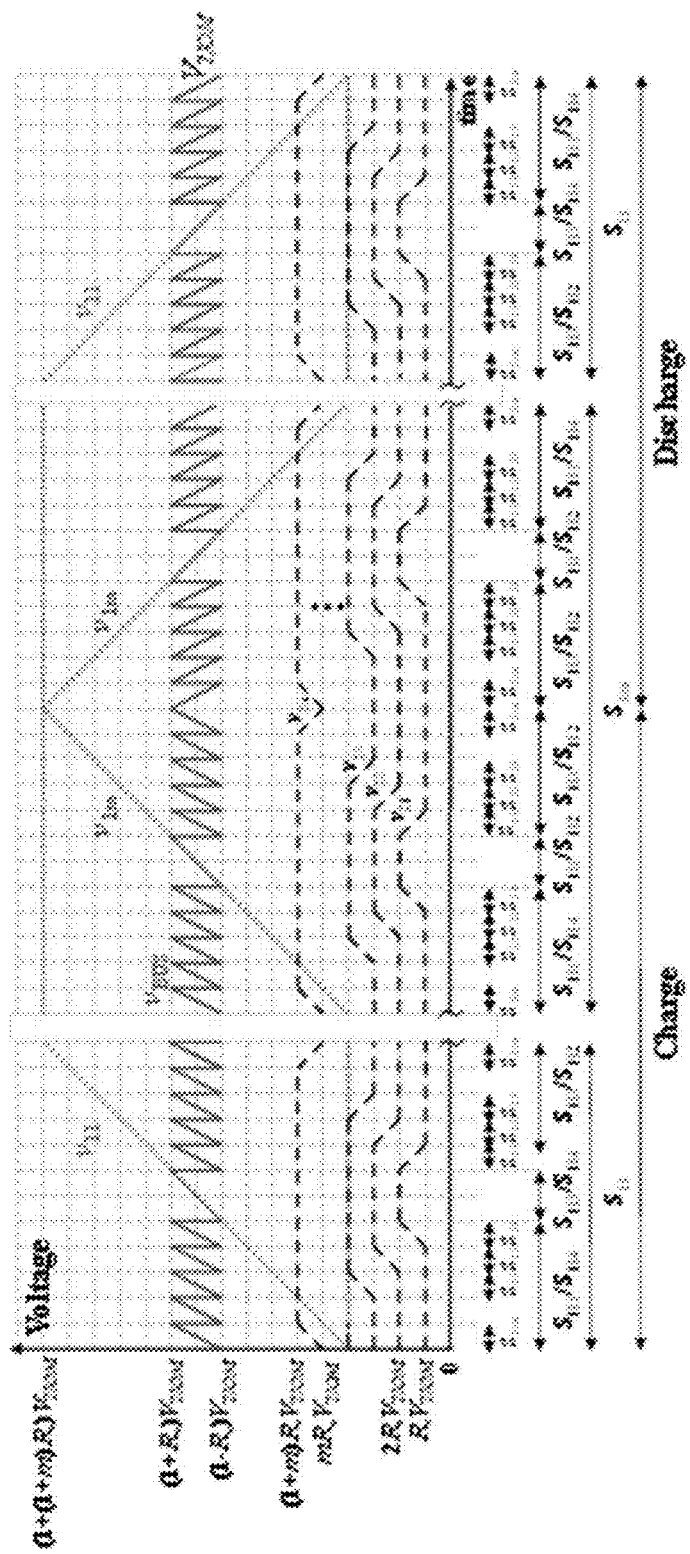
FIG. 4C depicts an example representation of normal operation switch states and individual capacitor voltage waveforms for the n-m enhanced bipolar SSC energy buffer shown in FIG. 4B according to one or more implementations.

The normal operation switch states and individual capacitor voltage waveforms for the n-m enhanced bipolar SSC energy buffer 240 shown in FIG. 4B with capacitors of equal capacitance values, a nominal bus voltage of $V_{nom}$, and a nominal-to-peak ripple voltage of $R_v V_{nom}$ are shown in FIG. 4C. The resultant dc bus voltage ($V_{BUS}$) is also shown in FIG. 4C. At the start of the charging phase, all capacitors are at their lowest energy state. At this time, the supporting capacitor with the highest voltage level ($C_{2m}$) is connected in series with one of the backbone capacitors ($C_{11}$) and these two capacitors are charged together. When the bus voltage reaches its maximum allowed value, switch $S_{2m}$ is turned off and $S_{2(m-1)}$ is turned on to connect the next supporting capacitor ($C_{2(m-1)}$) in series with the backbone capacitor and these two capacitors are then charged in series. This process is continued until all the supporting capacitors are charged. Next the h-bridge switches are flipped and the same process is continued, but this time the supporting capacitors are connected in anti-series with the backbone capacitor. This allows the supporting capacitors to be discharged to their original voltages while the backbone capacitor is charged. The backbone capacitor reaches its peak value, which is higher than the bus voltage, when all the supporting capacitors have been discharged. This charging process is repeated for the remaining backbone capacitors. Once all the backbone capacitors have been fully charged, the energy buffer discharges. The discharge process is simply the reverse of the charging process.

The bipolar SSC energy buffer circuit 240 shown in FIG. 4B may be operated as a standard or enhanced bipolar SSC energy buffer circuit depending on the control scheme used to control switch operation within the bipolar SSC energy buffer circuit 240.

Unipolar

Figure 4D:
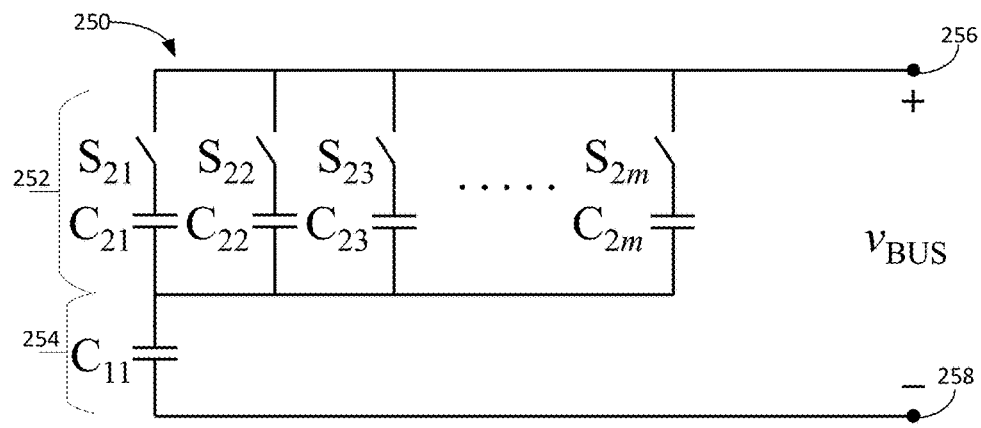
FIG. 4D depicts an example implementation of a 1-m standard unipolar SSC energy buffer circuit according to one or more implementations.

FIG. 4D shows an example implementation of a 1-m standard unipolar SSC energy buffer circuit 250. In this implementation, the unipolar SSC energy buffer circuit includes a first set of circuitry 252 and a second set of circuitry 254 in series with the first set of circuitry 252. The first set of circuitry 252 includes m "legs" each of which comprises a switch $S_{21}$, $S_{22}$, $S_{23}$, ... $S_{2m}$ series coupled with respective ones of m capacitors $C_{21}$, $C_{22}$, $C_{23}$, ... $C_{2m}$ (e.g., the switch $S_{21}$ is in series with the capacitor $C_{21}$, the switch $S_{22}$ is in series with the capacitor $C_{22}$, the switch $S_{23}$ is in series with the capacitor $C_{23}$, and the switch $S_{24}$ is in series with the capacitor $C_{24}$ and so forth). The first circuitry does not include the H-bridge switches of a bipolar SSC energy buffer circuit (see, e.g., $S_{h1}$, $S_{h2}$, $S_{h3}$, $S_{h4}$ shown in FIGS. 4A and 4C). Thus, the capacitors $C_{21}$, $C_{22}$, $C_{23}$, ... $C_{2m}$ are in the circuit 250 only in a positive manner (hence the term "unipolar").

The second set of circuitry 254 includes one backbone capacitor $C_{11}$ serially coupled to the first set of circuitry 252. The circuit 250 also includes a terminal 256 and a terminal 258 that collectively form a buffer port to provide the bus voltage, $V_{bus}$.

Figure 4E:
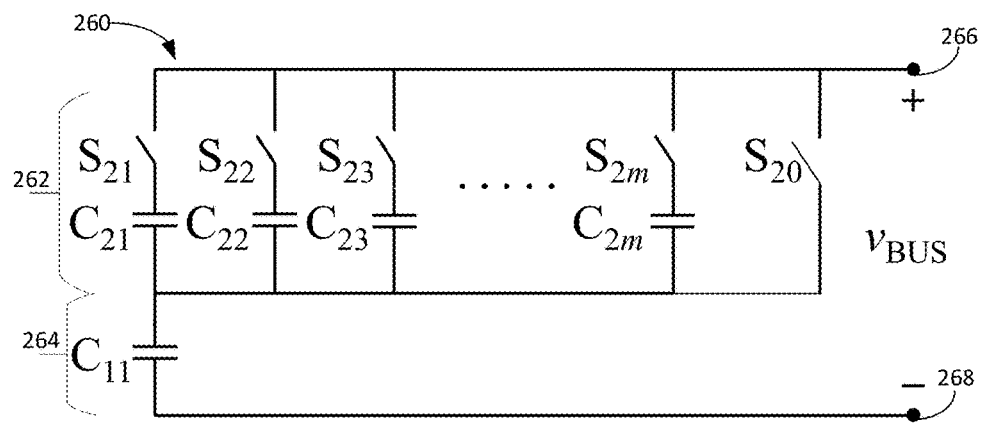
FIG. 4E depicts an example implementation of a 1-m enhanced unipolar SSC energy buffer circuit according to one or more implementations.

FIG. 4E shows an example implementation of a 1-m enhanced unipolar SSC energy buffer circuit 260. In this implementation, the enhanced unipolar SSC energy buffer circuit 260 includes a first set of circuitry 262 and a second set of circuitry 264 in series with the first set of circuitry 262. The first set of circuitry 262 includes m "legs" each of which comprises a switch $S_{21}$, $S_{22}$, $S_{23}$, ... $S_{2m}$ series coupled with respective ones of m capacitors $C_{21}$, $C_{22}$, $C_{23}$, ... $C_{2m}$ (e.g., the switch $S_{21}$ is in series with the capacitor $C_{21}$, the switch $S_{22}$ is in series with the capacitor $C_{22}$, the switch $S_{23}$ is in series with the capacitor $C_{23}$, and the switch $S_{24}$ is in series with the capacitor $C_{24}$ and so forth). The first circuitry does not include the H-bridge switches of a bipolar SSC energy buffer circuit (see, e.g., $S_{h1}$, $S_{h2}$, $S_{h3}$, $S_{h4}$ shown in FIGS. 4A and 4C). Thus, the capacitors $C_{21}$, $C_{22}$, $C_{23}$, ... $C_{2m}$ are in the circuit 260 only in a positive manner (hence the term "unipolar").

The second set of circuitry 264 includes one backbone capacitor $C_{11}$ serially coupled to the first set of circuitry 262. The circuit 260 also includes a terminal 266 and a terminal 268 that collectively form a buffer port to provide the bus voltage, $V_{bus}$.

The enhanced unipolar SSC energy buffer circuit 260 has an additional switch $S_{m+1}$ adapted to directly charge/discharge the backbone capacitor $C_{11}$.

In some applications, the standard or enhanced unipolar SSC energy buffer circuits 250 or 260 shown in FIGS. 4D and 4E, respectively, are attractive compared to bipolar SSC energy buffer circuits because the unipolar designs include fewer switches and are potentially more efficient since charging takes place through one series switch instead of three or four in bipolar designs.

FIGS. 4A-4E show example SSC energy buffer circuits. Other SSC energy buffer circuits may also be used. PCT applications PCT/US13/21926 entitled "STACKED SWITCHED CAPACITOR ENERGY BUFFER CIRCUIT ARCHITECTURE," PCT/US13/22001 entitled "ENHANCED STACKED SWITCHED CAPACITOR ENERGY BUFFER CIRCUIT" and PCT/US13/24552 entitled "SYSTEMS APPROACH TO PHOTOVOLTAIC ENERGY EXTRACTION," for example, describe a number of other types of SSC energy buffer circuits that may also be used. Again, the circuits shown in these applications are merely examples and other configurations and types of SSC energy buffer circuits may be used.

Capacitance Ratio Optimization

Bipolar SSC Energy Buffer Circuit

A performance metric for energy buffers is their energy buffering ratio ($\Gamma_b$), which is defined as the ratio of the energy that can be injected and extracted from the buffer in one charge-discharge cycle to the total energy capacity of the buffer. The larger the energy buffering ratio, the smaller the required total energy capacity of the energy buffer. All bipolar SSC energy buffers presented thus far use capacitors of equal capacitance value. The energy buffering ratio of an n-m enhanced bipolar SSC energy buffer using equal valued capacitors is given by the following formula:

$$\Gamma_b = \frac{n[(1 + (m+1)R_v)^2 - (1 - (m+1)R_v)^2]}{n(1 + (m+1)R_v)^2 + (2^2 + 3^2 + \ldots + (m+1)^2)R_v^2} \quad (1)$$

Here, $R_v$ is the dc bus voltage ripple ratio, defined as the ratio of the peak voltage ripple amplitude to the nominal value of the dc bus voltage.

In principle, bipolar SSC energy buffers can also have unequal capacitance values. However, a design methodology to optimally select the capacitance values of its capacitors has not yet been presented. The development of such a methodology may provide an expression for the energy buffering ratio of the bipolar SSC energy buffer with capacitors of arbitrary capacitance values. By definition, the energy buffering ratio can be given by the following formula:

$$\Gamma_b = \frac{W_{ini} - W_{fin}}{W_{rated}} \quad (2)$$

Where $W_{ini}$, $W_{fin}$ and $W_{rated}$ are the initial stored energy, the final stored energy and the maximum (i.e. rated) energy capacity of the energy buffer, respectively. The initial and final values of the energy stored in the buffer may be given by the following formulas:

$$W_{ini} = \sum_{k=1}^{n} \frac{1}{2} C_{1k} V_{C1k(max)}^2 + \sum_{k=1}^{m} \frac{1}{2} C_{2k} V_{C2k(min)}^2 \quad (3)$$

$$W_{fin} = \sum_{k=1}^{n} \frac{1}{2} C_{1k} V_{C1k(min)}^2 + \sum_{k=1}^{m} \frac{1}{2} C_{2k} V_{C2k(min)}^2. \quad (4)$$

The first term in each of the above equations represents the energy stored in the backbone capacitors and the second term represents the energy stored in the supporting capacitors. Note from (3) and (4) that the initial and final energy stored in the supporting capacitors is the same, as can also be seen from FIG. 4C. Hence, in this implementation, over a half line period, there is no net change in the energy of the supporting capacitors, and they do not contribute towards the energy buffered in the energy buffer. However, the supporting capacitors do contribute to the total energy storage capacity of the buffer, which is given by:

$$W_{rated} = \sum_{k=1}^{n} \frac{1}{2} C_{1k} V_{c1k(max)}^2 + \sum_{k=1}^{m} \frac{1}{2} C_{2k} V_{c2k(max)}^2. \quad (5)$$

Figure 5:
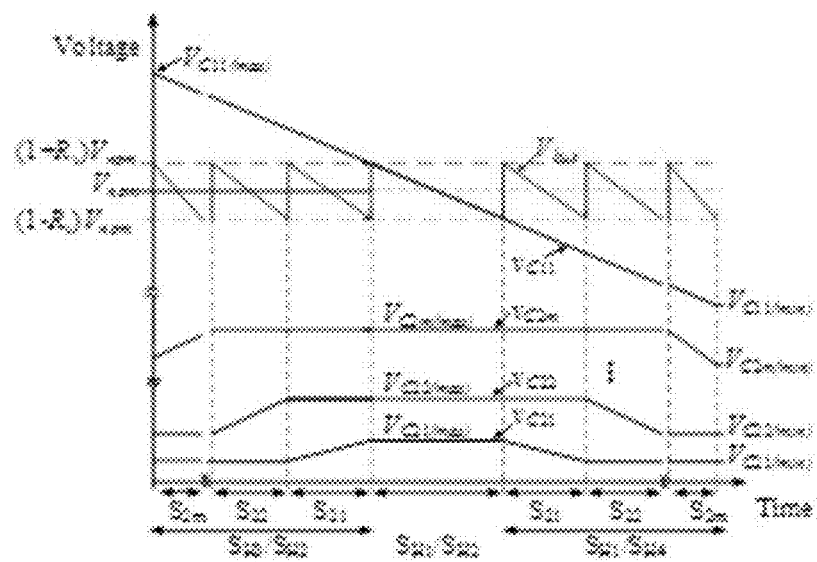
FIG. 5 depicts an example discharge cycle for one backbone capacitor in an enhanced bipolar SSC energy buffer with m supporting capacitors during normal operation according to one or more implementations.

In order to determine $W_{ini}$, $W_{fin}$ and $W_{rated}$, expressions for the initial and final voltages on each of the capacitors are needed. FIG. 5 shows an example discharge cycle for one backbone capacitor ($C_{11}$) in an enhanced bipolar SSC energy buffer with m supporting capacitors during normal operation. For simplicity, FIG. 5 is drawn assuming a constant current discharge. However, the expressions provided here are also valid for non-constant discharge currents since they depend only on the total charge that flows through each capacitor. During the period when $S_{H1}$ and $S_{H2}$ are on, i.e., when only the backbone capacitor is connected across the dc bus, the backbone capacitor voltage decreases from $(1+R_V)V_{nom}$ to $(1-R_V)V_{nom}$, at which point $S_{21}$ is turned on and $C_{21}$ is connected in series with the backbone capacitor. This increases the bus voltage back to $(1+R_V)V_{nom}$. Hence, the maximum voltage on $C_{21}$ may be equal to the bus peak-to-peak ripple voltage:

$$V_{c21(max)} = 2R_v V_{nom}. \qquad (6)$$

Next, $C_{11}$ and $C_{21}$ are discharged in series until the bus voltage drops again by $2R_v V_{nom}$. Since $C_{11}$ and $C_{21}$ are discharged by the same current, their individual voltage drops are inversely proportional to their capacitance values. Hence, $V_{C21(min)}$ is given by the following:

$$V_{c21(min)} = 2R_v V_{nom} \frac{C_{21}}{C_{21} + C_{11}}. \qquad (7)$$

Next, $S_{21}$ is turned off and $S_{22}$ is turned on, connecting $C_{22}$ in series with $C_{11}$. The bus voltage again rises to its maximum allowed value, i.e., increase by $2R_v V_{nom}$. Therefore the maximum voltage on $C_{22}$ is $2R_v V_{nom}$ greater than the minimum voltage on $C_{21}$. Hence $V_{c22(max)}$ may be given by the following:

$$V_{c22(max)} = 2R_v V_{nom} + 2R_v V_{nom} \frac{C_{21}}{C_{21} + C_{11}}. \qquad (8)$$

Next, $C_{22}$ discharges in series with $C_{11}$ and the bus voltage again reaches its minimum threshold. At this instant, $C_{22}$ is at its minimum voltage level, which can be determined using the same procedure used for computing $V_{c21(min)}$:

$$V_{c22(min)} = 2R_v V_{nom} \frac{C_{21}}{C_{21} + C_{11}} + 2R_v V_{nom} \frac{C_{22}}{C_{22} + C_{11}} \qquad (9)$$

All the remaining supporting capacitors are also connected one at a time in series with $C_{11}$ and discharged as shown in FIG. 5. Hence, a similar procedure, as used for the computation of maximum and minimum voltages on $C_{21}$ and $C_{22}$, can be used to determine the maximum and minimum voltages of all the remaining supporting capacitors. The maximum and minimum voltages on a supporting capacitor $C_{2k}$ are given by the following:

$$V_{c2k(max)} = 2R_v V_{nom} + \sum_{j=1}^{k-1} 2R_v V_{nom} \frac{C_{2j}}{C_{2j} + C_{11}}, \text{ and} \qquad (10)$$

$$V_{c2k(min)} = \sum_{j=1}^{k} 2R_v V_{nom} \frac{C_{2j}}{C_{2j} + C_{11}}. \qquad (11)$$

Next the minimum and maximum voltages across the backbone capacitors may be determined. At the end of the discharge cycle, the bus voltage is $(1-R_V)V_{nom}$, and the supporting capacitor $C_{2m}$ is at its minimum voltage level and is connected in series with $C_{11}$. Hence the minimum voltage on $C_{11}$ may be given by the following:

$$V_{c11(min)} = (1 - R_v)V_{nom} - \sum_{j=1}^{m} 2R_v V_{nom} \frac{C_{2j}}{C_{2j} + C_{11}}. \qquad (12)$$

Similarly at the beginning of discharge cycle, the bus voltage is $(1+R_V)V_{nom}$ and $C_{2m}$ is at its minimum voltage level and connected in anti-series with $C_{11}$. Hence, the maximum voltage on $C_{11}$ may be given by the following:

$$V_{c11(max)} = (1 + R_v)V_{nom} + \sum_{j=1}^{m} 2R_v V_{nom} \frac{C_{2j}}{C_{2j} + C_{11}}. \qquad (13)$$

Since all the backbone capacitors are charged and discharged in an identical fashion, the maximum and minimum voltages of the remaining backbone capacitors are equal to the maximum and minimum voltages of $C_{11}$.

The maximum and minimum voltage values of all the capacitors can be substituted into equations (2)-(5) to determine the energy buffering ratio for an n-m enhanced bipolar SSC energy buffer with capacitors having arbitrary capacitance values:

$$\Gamma_b = \frac{4nR_v\left[1 + 2\sum_{j=1}^{m} \frac{\alpha_{2j}}{1+\alpha_{2j}}\right]}{n\left[(1+R_v) + 2R_v\sum_{j=1}^{m} \frac{\alpha_{2j}}{1+\alpha_{2j}}\right]^2 + \alpha_{21}(2R_v)^2 + \sum_{k=2}^{m} \alpha_{2k}\left(2R_v + 2R_v\sum_{j=1}^{k-1} \frac{\alpha_{2j}}{1+\alpha_{2j}}\right)^2} \qquad (14)$$

Here $\alpha_{21}, \alpha_{22}, \ldots \alpha_{2m}$ are the ratios of the capacitance values of the supporting capacitors ($C_{21}, C_{22}, C_{23}, \ldots C_{2m}$) to the capacitance value of the backbone capacitor $C_{11}$, i.e., $$\alpha_{2j} \equiv \frac{C_{2j}}{C_{11}}.$$

Equation (14) assumes that the capacitance values of all the backbone capacitors are identical; this is an optimum choice since the function of all the backbone capacitors is identical. As expected, (14) reduces to (1) when all the capacitance ratios are set to one.

Figure 6:
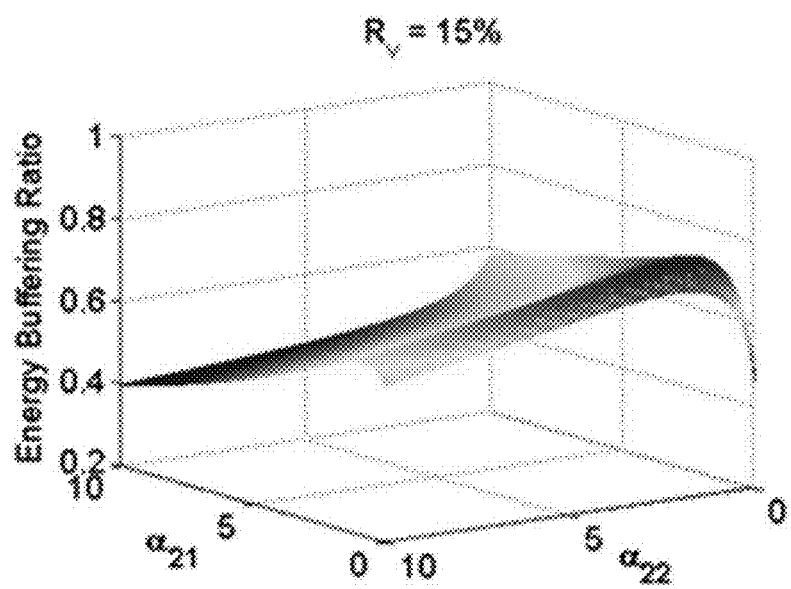
FIG. 6 depicts an example energy buffering ratio of a 1-2 enhanced bipolar SSC energy buffer according to one or more implementations
Figure 7:
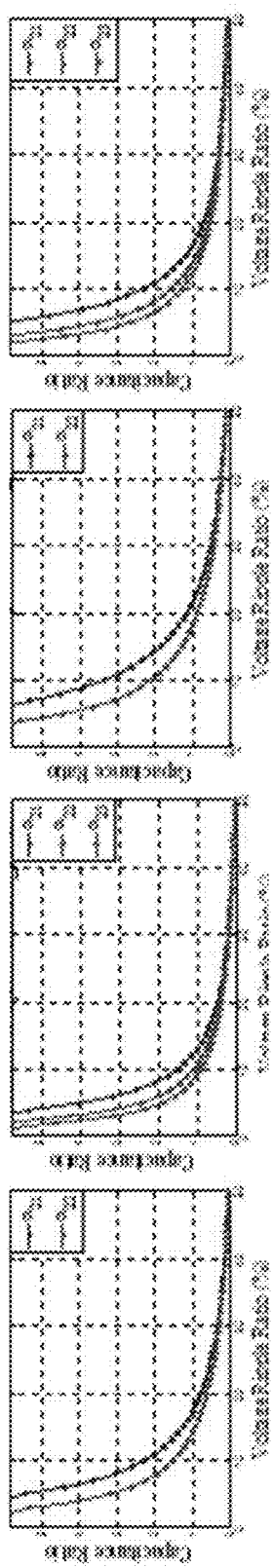
FIG. 7 depicts example optimal capacitance ratios for four different enhanced bipolar SSC energy buffers (1-2, 1-3, 2-2 and 2-3) as a function of voltage ripple ratio according to one or more implementations.

FIG. 6 shows an example energy buffering ratio of a 1-2 enhanced bipolar SSC energy buffer, computed using (14), as a function of its capacitance ratios ($\alpha_{21}$ and $\alpha_{22}$) in the range of 0.1 to 10, for a voltage ripple ratio of 15%. As can be seen from the example shown in FIG. 6, there is an optimal point in the $\alpha_{21}$-$\alpha_{22}$ space where the energy buffering ratio is maximized. The optimal capacitance ratios for four different enhanced bipolar SSC energy buffers (1-2, 1-3, 2-2 and 2-3) as a function of voltage ripple ratio are shown in FIG. 7. It can be seen that as ripple ratio increases, the required capacitance of the supporting capacitors decreases. As the ripple ratio reaches 100% the energy buffering capability of a single capacitor also reaches 100%, making a single capacitor the optimal design. Hence, the designs that have large backbone capacitors relative to the supporting capacitors, and hence behave more like single capacitors, are optimal for large ripple ratios. It can be noted that increase in the number of supporting capacitors (e.g., going from the 1-2 to the 1-3 design) results in a reduction in the optimal capacitance value of the supporting capacitors.

Figure 8:
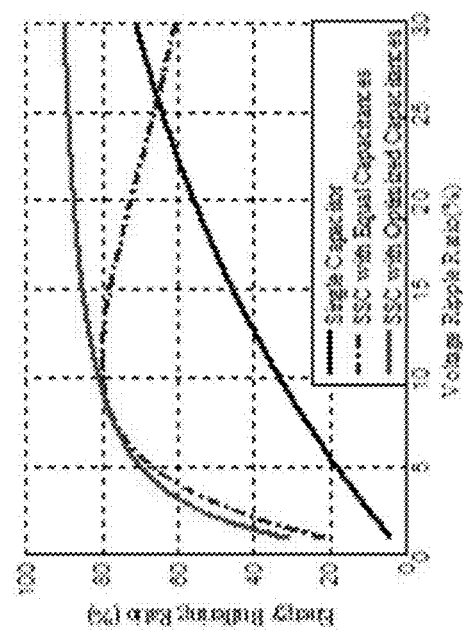
FIG. 8 depicts an example comparison of an energy buffering ratio of a 2-5 enhanced bipolar SSC energy buffer when designed with optimized capacitance ratios versus when designed with equal capacitance according to one or more implementations.

FIG. 8 compares the energy buffering ratio of a 2-5 enhanced bipolar SSC energy buffer when designed with optimized capacitance ratios (top solid line) versus when designed with equal capacitance (middle dashed line). The energy buffering ratio of a single capacitor (bottom solid line) is also plotted for comparison. Clearly, the design with optimized capacitance ratios has a higher energy buffering ratio; the difference being large at high and low ripple ratios. Also note that the equal capacitance design achieves a maximum energy buffering ratio at a particular ripple ratio. However, with optimized capacitance ratios, energy buffering ratio increases monotonically with ripple ratio.

The relative increase in energy buffering ratio due to capacitance ratio optimization for a number of enhanced bipolar SSC energy buffers is shown in FIG. 9. The non-monotonic shape of an individual curve in FIG. 9 can be understood by noting that for large ripple ratios, the improvement in energy buffering ratio comes from a reduction in supporting capacitor size; while for small ripple ratios the improvement comes from a larger voltage variation across the backbone capacitors. It can also be seen from FIG. 9 that for a given number of backbone capacitors for large ripple ratios, the larger the number of supporting capacitors, the greater is the improvement in energy buffering ratio relative to the equal capacitance design.

Unipolar SSC Energy Buffer Circuit

Figure 18:
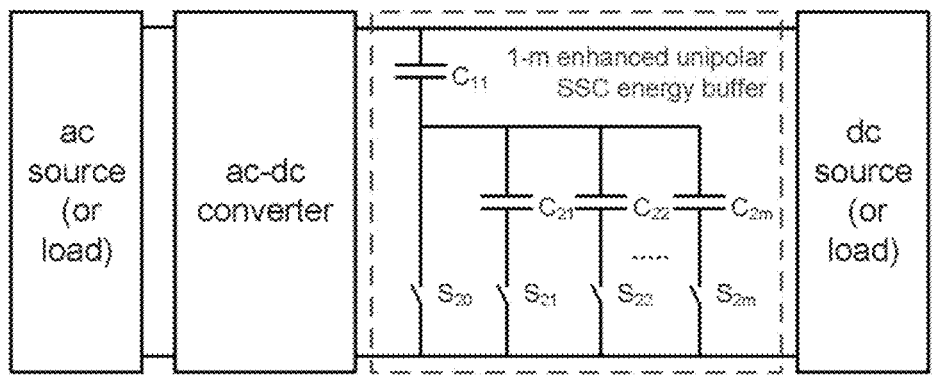
FIG. 18 depicts an example topology of an enhanced unipolar SSC energy buffer circuit 400 connected across the dc port of a single-phase ac-dc converter according to one or more implementations.
Figure 19:
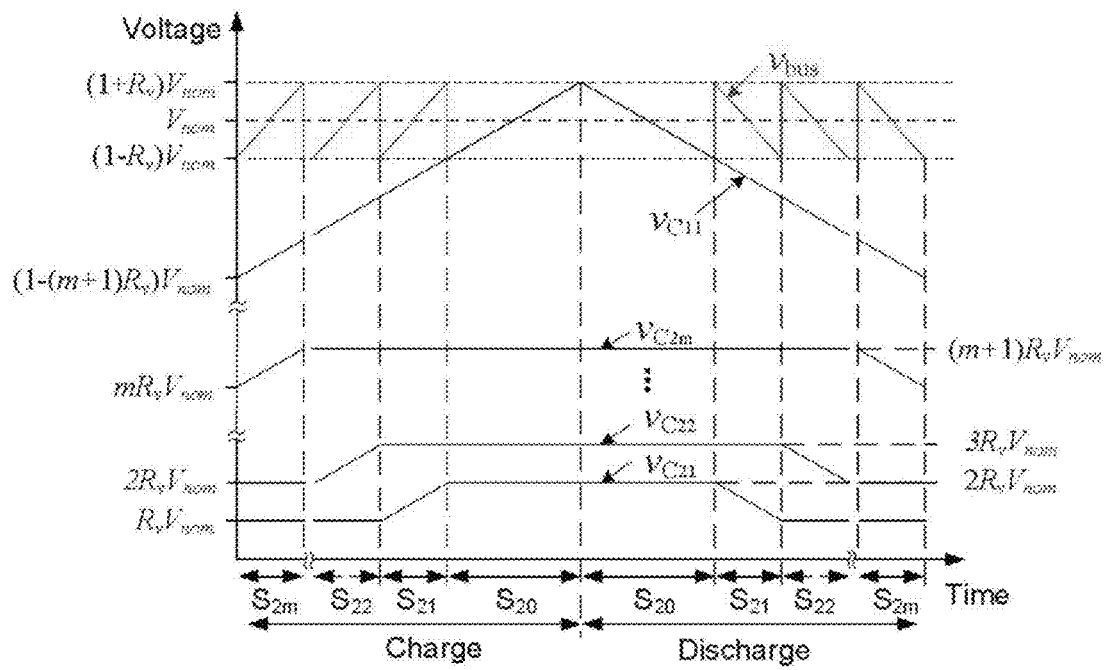
FIG. 19 depicts an example dc bus and individual capacitor voltages during normal operation of a 1-m enhanced unipolar SSC energy buffer with capacitors of equal capacitance, such as the circuit 400 of FIG. 18.

FIG. 18 shows an example topology of an enhanced unipolar SSC energy buffer circuit 400 connected across the dc port of a single-phase ac-dc converter. This SSC energy buffer has one backbone capacitor (C11), m supporting capacitors (C21, C22, . . . , C2m) and (m+1) supporting switches ($S_{20}$, $S_{21}$, . . . , $S_{2m}$) and is referred to as the 1-m design. In a conventional/standard design, all capacitors have equal capacitance and different voltage ratings. The capacitors are precharged to appropriate voltage levels through a specific precharge switching sequence before the buffer starts normal operation. These initial voltage levels help maintain a narrow range dc bus voltage during normal charge/discharge operation of the buffer FIG. 19 shows the dc bus and individual capacitor voltages during normal operation of a 1-m enhanced unipolar SSC energy buffer with capacitors of equal capacitance, such as the circuit 400 of FIG. 18. These waveforms assume that the SSC energy buffer is charged and discharged with constant current. During normal operation the switches turn on and off in sequence, as shown in FIG. 19. S20 is on (and all the other switches are off) when the energy buffer starts to discharge from its fully charged state. When the dc bus voltage reaches its minimum allowed value, S20 is turned off and S21 is turned on so that the voltage across C21 adds to the voltage across C11 and elevates the dc bus voltage back to its maximum allowed value. Now C11 and C21 are discharged in series until the minimum bus voltage threshold is again reached, and the next switch transition takes place. This process continues until all the capacitors have been utilized. After this the charging process must begin, which is simply the reverse of the discharging process.

An important metric for energy buffers is the energy buffering ratio ($\Gamma_b$), which is defined as the ratio of the energy that can be injected and extracted from an energy buffer in one charge/discharge cycle to the total energy capacity of the buffer. The energy buffering ratio of the 1-m enhanced unipolar SSC energy buffer with all capacitors having equal capacitance is given by:

$$\Gamma_b = \frac{2(m+2)R_v}{(2^2 + 3^2 + \ldots + (m+1)^2)R_v^2 + (1+R_v)^2}. \quad (20)$$

Here, $R_v$ is the dc bus voltage ripple ratio, defined as the ratio of the peak voltage ripple amplitude to the nominal value of the voltage of the dc bus, and m is the number of supporting capacitors. The larger the value of $\Gamma_b$ the smaller the energy buffer can be for a given amount of energy that needs to be buffered. Hence, maximizing energy buffering ratio for a given value of voltage ripple ratio and number of supporting capacitors is a highly desirable objective.

Typical SSC energy buffers have used capacitors of equal capacitance value. In principle, SSC energy buffers can also be designed with capacitors having different capacitance values. However, no design methodology has been presented for selecting the optimal capacitance values of the capacitors in the energy buffer, so as to maximize its energy buffering ratio and hence minimize its size. The development of such a methodology can be facilitated by having an expression for the energy buffering ratio of the SSC energy buffer with capacitors of unequal capacitance values. By definition, energy buffering ratio is given by:

$$\Gamma_b = (W_{max} - W_{min})/W_{rated}, \quad (21)$$

where Wmax and Wmin are the maximum and minimum values of energy stored in the energy buffer during normal operation, and Wrated is the total energy capacity of the energy buffer. In the case of the enhanced unipolar SSC energy buffer Wrated=Wmax; hence, (21) reduces to:

$$\Gamma_b = 1 - (W\text{min}/W\text{max}). \quad (22)$$

The maximum and minimum energy stored in a 1-m enhanced unipolar SSC energy buffer can be expressed in terms of the individual capacitors' initial (when the energy buffer is fully charged) and final (when the energy buffer is fully discharged) voltages, respectively:

$$W_{max} = \frac{1}{2}C_{11}V_{C_{11}(ini)}^2 + \sum_{j=1}^{m}\frac{1}{2}C_{2j}V_{C_{2j}(ini)}^2, \quad (23),(24)$$

$$W_{min} = \frac{1}{2}C_{11}V_{C_{11}(fin)}^2 + \sum_{j=1}^{m}\frac{1}{2}C_{2j}V_{C_{2j}(fin)}^2.$$

Here $VC_{ij(ini)}$ and $VC_{ij(fin)}$ are the initial and the final voltages across capacitor $C_{ij}$ at the start and at the end of the discharge period, respectively, as shown in FIG. 20. FIG. 20 shows the voltage waveforms for a 1-m enhanced unipolar SSC energy buffer with arbitrary capacitance values, when it is discharged by a constant current during normal operation. These waveforms can be used to express the initial and final voltages across each capacitor in terms of the dc bus nominal voltage (Vnom), the dc bus voltage ripple ratio (Rv) and the capacitance ratios, as discussed below. When the enhanced unipolar SSC energy buffer is fully charged (i.e., the initial state), capacitor $C_{11}$ is directly connected across the dc bus. Hence, the initial voltage of $C_{11}$ equals the dc bus maximum allowed voltage:

$$V_{C11(ini)} = (1+R_v)V_{nom}. \quad (25)$$

As the energy buffer discharges, the voltage across $C_{11}$ decreases. When this voltage reaches the minimum allowed dc bus voltage value of $(1-R_v)V_{nom}$, capacitor $C_{21}$ is connected in series with $C_{11}$ to boost the dc bus voltage. For the dc bus voltage to be boosted to its maximum allowed value, the initial voltage across $C_{21}$ is:

$$V_{C21(ini)} = 2R_v V_{nom}. \quad (26)$$

Next, C11 and C21 are discharged in series until the total voltage drop across them equals 2RvVnom, and the dc bus voltage again reaches (1−Rv)Vnom. Since the two capacitors are discharged by the same current, their individual voltage drops are inversely proportional to their capacitance values. Hence, the final voltage across C21 is given by:

$$V_{C21(fin)} = 2R_v V_{nom} - 2R_v V_{nom}(C_{11}/(C_{21}+C_{11})). \quad (27)$$

To boost the dc bus voltage to its maximum allowed value, $C_{22}$ is next connected in series with $C_{11}$. Then, $C_{11}$ and $C_{22}$ are discharged until the total voltage drop across them reaches $2R_v V_{nom}$. Capacitor $C_{23}$ is then connected in series with $C_{11}$ and the discharge continues. This process is repeated with all the remaining supporting capacitors, until $C_{2m}$ has also been discharged. Applying the principles used above to determine the initial and final voltages across $C_{21}$, the initial and final voltages for the other supporting capacitors are given by:

$$V_{C_{2k}(ini)} = 2R_v V_{nom} + 2R_v V_{nom} \sum_{j=2}^{k} \frac{C_{2(j-1)}}{C_{2(j-1)} + C_{11}}, \quad (28)\text{ and }(29)$$

$$V_{C_{2k}(fin)} = V_{C_{2k}(ini)} - 2R_v V_{nom} \frac{C_{11}}{C_{2k} + C_{11}},$$

where k=2, ..., m; and the final voltage across C11 is given by:

$$V_{C_{11}(fin)} = (1 - R_v)V_{nom} - 2R_v V_{nom} \sum_{j=1}^{m} \frac{C_{2j}}{C_{2j} + C_{11}}. \quad (30)$$

$$\Gamma_b = 1 - \frac{4\left[\alpha_{21}\left(\frac{\alpha_{21}}{\alpha_{21}+1}\right)^2 + \ldots + \alpha_{2k}\left(\sum_{j=1}^{k}\frac{\alpha_{2j}}{\alpha_{2j}+1}\right)^2 + \ldots + \alpha_{2m}\left(\sum_{j=1}^{m}\frac{\alpha_{2j}}{\alpha_{2j}+1}\right)^2\right]R_v^2 + \left[1 - \left(1 + 2\sum_{j=1}^{m}\frac{\alpha_{2i}}{\alpha_{2j}+1}\right)R_v\right]^2}{4\left[\alpha_{21} + \ldots + \alpha_{2k}\left(1 + \sum_{j=2}^{k}\frac{\alpha_{2(j-1)}}{\alpha_{2(j-1)}+1}\right)^2 + \ldots + \alpha_{2m}\left(1 + \sum_{j=2}^{m}\frac{\alpha_{2(j-1)}}{\alpha_{2(j-1)}+1}\right)^2\right]R_v^2 + (1+R_v)^2} \quad (31)$$

These expressions for the initial and final voltages across all the capacitors ((20)-(25)) can be substituted into (23) and (24), and then into (22) to yield (31) (which is also shown for additional clarity in FIG. 21)—an expression for the energy buffering ratio of the 1-m enhanced unipolar SSC energy buffer with capacitors of unequal capacitance values. In (31), $\alpha_{21}=C_{21}/C_{11}$, $\alpha_{22}=C_{22}/C_{11}$, ..., and $\alpha_{2m}=C_{2m}/C_{11}$ are the ratios of the capacitance values of the supporting capacitors ($C_{21}$, ..., $C_{2m}$) to the capacitance value of the backbone capacitor ($C_{11}$). This expression for energy buffering ratio is only in terms of the dc bus voltage ripple ratio and the capacitance ratios, and reduces to (20) when all the capacitance ratios are set to one (i.e., equal capacitance values).

Figure 22:
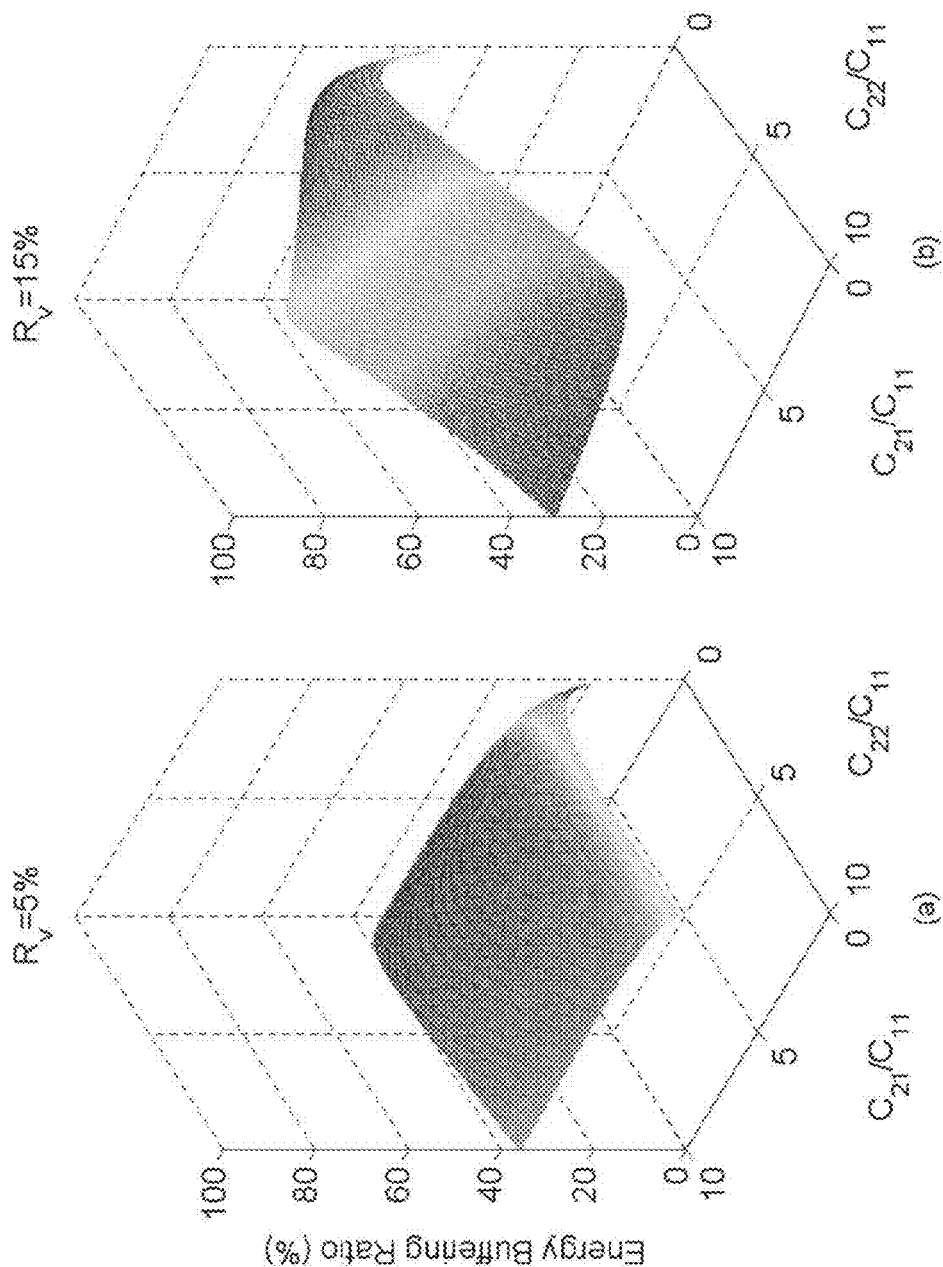
FIG. 22 depicts an example representation of an energy buffering ratio of a 1-2 enhanced unipolar SSC energy buffer for two values of voltage ripple ratio (5% and 15%) according to one or more implementations.

FIG. 22 shows the energy buffering ratio of a 1-2 enhanced unipolar SSC energy buffer, computed using (31), as a function of its capacitance ratios ($\alpha_{21}$ and $\alpha_{22}$) in the range of 0.1 to 10, for two values of voltage ripple ratio (5% and 15%). As can be seen from FIG. 22, there is clearly an optimal point in the $\alpha_{21}$-$\alpha_{22}$ space where the energy buffering ratio is maximized. Conducting a brute force exhaustive search for this optimal point by sweeping across values of $\alpha_{21}$, $\alpha_{22}$, ..., $\alpha_{2m}$ is computationally inefficient, especially in designs with a large number of supporting capacitors (m) and for a range of values of the voltage ripple ratio ($R_v$). Hence, a gradient based search algorithm is developed to increase the computational speed. This search algorithm starts with all the capacitance ratios ($\alpha_{21}$, ..., $\alpha_{2m}$) set to a user defined initial value. In each step, the capacitance ratio associated with one of the supporting capacitors is changed by a fixed amount. If the change results in an increase in the energy buffering ratio, then the change in capacitance ratio is retained, otherwise it is rolled back. In the next step, the capacitance ratio associated with a different supporting capacitor is changed, and again the change retained only if it increases the energy buffering ratio. This process is repeated until the energy buffering ratio stops increasing. As shown in Table I this algorithm increases the computational speed by three orders of magnitude even for designs with two supporting capacitors.

Figure 23:
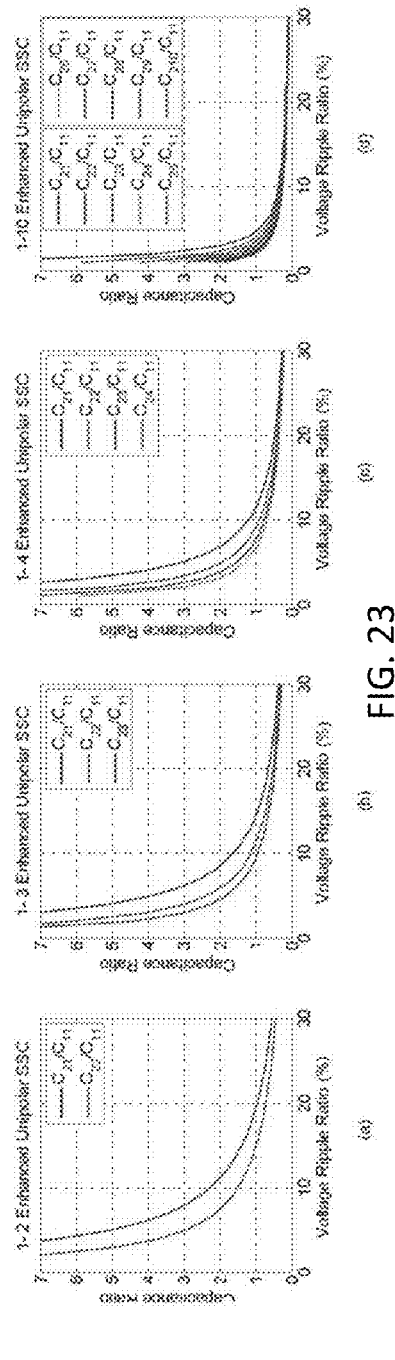
FIG. 23 depicts an example representation of capacitance ratios for four different enhanced unipolar SSC energy buffers (1-2, 1-3, 1-4 and 1-10) as a function of voltage ripple ratio according to one or more implementations.

The optimal capacitance ratios for four different enhanced unipolar SSC energy buffers (1-2, 1-3, 1-4 and 1-10) as a function of voltage ripple ratio are shown in FIG. 23. It is interesting to note that in all cases, as the voltage ripple ratio increases, the optimal capacitance ratios for all the supporting capacitors decrease. This is quite understandable, since as the voltage ripple ratio approaches 100%, the energy buffering ratio of a single capacitor reaches 100%; making the single capacitor the optimal design. Hence, designs that have a large backbone capacitor relative to the supporting capacitors (and therefore behave more like a single capacitor) are optimal for large ripple ratios. Also it is worth noting that for a given voltage ripple ratio, the optimal capacitance ratios of the supporting capacitors are lower in designs with a larger number of supporting capacitors, i.e., α21(=C21/C11) is lower in the 1-3 design compared to the 1-2 design.

Figure 24:
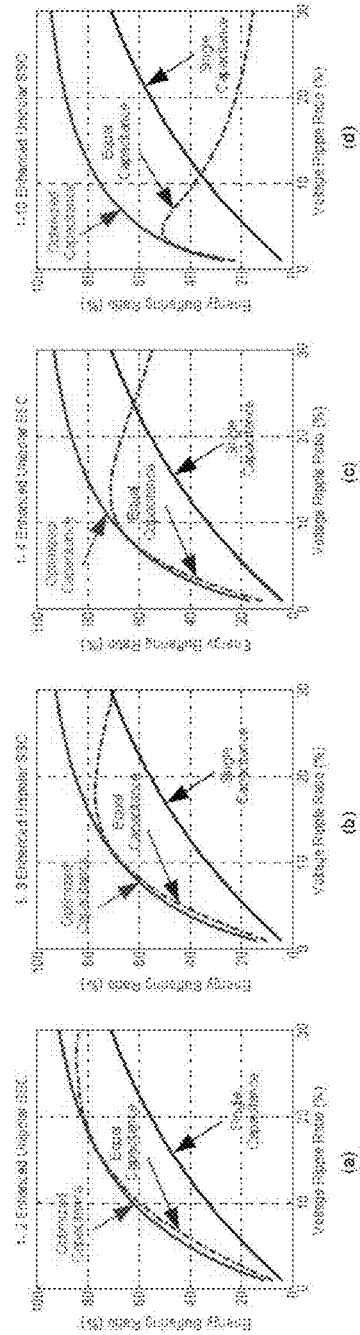
FIG. 24 depicts an example representation of a comparison of an energy buffering ratio of example 1-m enhanced unipolar SSC energy buffers when designed with optimized capacitance ratios versus when designed with equal capacitance according to one or more implementations.
Figure 25:
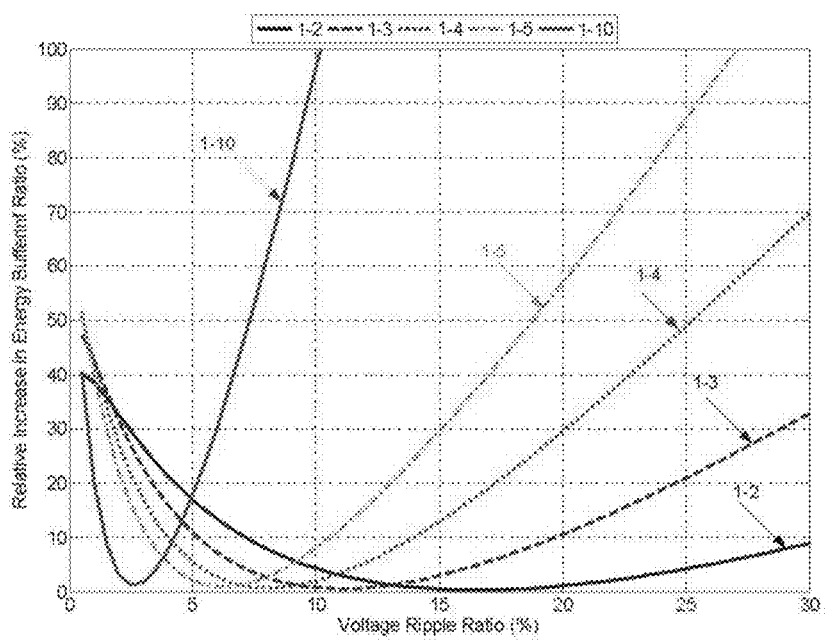
FIG. 25 depicts an example representation of relative enhancement in energy buffering ratio of enhanced unipolar SSC energy buffers with different number of supporting capacitors when designed with optimized capacitance ratios versus when designed with equal capacitance values according to one or more implementations.

FIG. 24 compares the energy buffering ratio of the same four 1-m enhanced unipolar SSC energy buffers (1-2, 1-3, 1-4 and 1-10) when designed with optimized capacitance ratios (red solid line) versus when designed with equal capacitance (blue dashed line). The energy buffering ratio of a single capacitor (black solid line) is also plotted for comparison purposes. Clearly, the energy buffering ratio is higher when the capacitance ratio is optimized. The relative enhancement in energy buffering ratio depends on the voltage ripple ratio. In each design (1-2, 1-3, 1-4 and 1-10) there is a narrow range of voltage ripple ratios in which the optimal capacitance ratios are close to unity and the enhancement in energy buffering ratio is not significant. However, at voltage ripple ratios above and below this range, substantial improvements in energy buffering ratio can be attained by optimally selecting the relative capacitance values of the capacitors in the energy buffer. This is especially true at high ripple ratios for designs with a large number of supporting capacitors, as can be seen from both FIG. 24 and FIG. 25. FIG. 25 shows the relative enhancement in energy buffering ratio of enhanced unipolar SSC energy buffers with different number of supporting capacitors when designed with optimized capacitance ratios versus when designed with equal capacitance values. Even the 1-2 enhanced unipolar SSC energy buffer designed for a 5% voltage ripple ratio achieves a 17% enhancement in energy buffering ratio, when using optimized capacitance ratios, this can translate to a 17% reduction in passive volume.

It is also worth noting that the energy buffering ratio of the enhanced unipolar SSC energy buffers with equal capacitance values is a non-monotonic function of voltage ripple ratio and reaches a maximum value at a voltage ripple ratio given by:

$$R_v = \frac{1}{\sqrt{2 + 2^2 + 3^2 + \ldots + (m+1)^2}}. \quad (32)$$

However, no such limit on energy buffering ratio exists if the capacitance ratios are optimally selected.

In one particular implementation, for example, an analytical framework is provided for the optimization of enhanced unipolar SSC energy buffers with an arbitrary number of supporting capacitors. As described above and in Appendix A to U.S. provisional patent application No. 62/050,109 previously incorporated by reference, for example, a method is demonstrated for optimizing capacitance ratios in an example enhanced unipolar SSC energy buffer circuit using an example prototype 1-2 enhanced unipolar SSC energy buffer designed for an 8-W offline LED driver. As described in further detail herein and in Appendix B to the '109 provisional application a method for optimizing capacitance ratios is also demonstrated in an example enhanced bipolar SSC energy buffer circuit.

In other implementations, gate drive signals for at least one of the switches in an SSC energy buffer circuit are ground referenced. In at least some of these implementations, the use of ground referenced gate (or other switch control terminal) drive signals permits the SSC energy buffer circuit to be operated without level-shifting the gate drive signals of at least a portion of the switches within the SSC energy buffer circuit. Although examples show MOSFET switches with gate drive signals, other switches may be controlled via a control terminal of the switch. For example, a bipolar junction transistor (BJT) may similarly be controlled via a base drive signal. An example implementation of a ground reference gate driver is described and shown in further detail in Appendix C of U.S. provisional patent application No. 62/050,109 previously incorporated by reference (see, e.g., section 4.3 of Appendix C of the provisional application).

In other implementations, elimination of a separate pre-charge circuit (as used in other SSC energy buffer circuits) is achieved through control of at least a portion of the switches of the SSC energy buffer circuit rather than using a separate pre-charge circuit to perform the function of pre-charging capacitors within the SSC energy buffer circuit prior to the normal operation of the SSC energy buffer circuit.

In one implementation, for example, a microcontroller used in controlling one or more other operations within the SSC energy buffer circuit is used to control a pre-charge routine to precharge one or more capacitors of the SSC energy buffer circuit by controlling one or more corresponding switches of the SSC energy buffer circuit. For example, a microcontroller, in some implementations, is adapted to turn on switches of the SSC energy buffer circuit (e.g., of a supporting block and/or backbone block of the circuit) circuit initially to connect corresponding capacitors within a block (supporting or backbone block) of the SSC energy buffer circuit in parallel and in series with one or more capacitors of the other block (backbone or supporting block) of the SSC energy buffer circuit. Before the SSC energy buffer circuit starts normal operation, the capacitors are pre-charged. One example of a pre-charge routine is described in detail in Appendix C to the '109 provisional application. See, e.g., section 4.4 of Appendix C. Other routines are also contemplated.

Improved Capacitance Ratio Optimization

Figure 10:
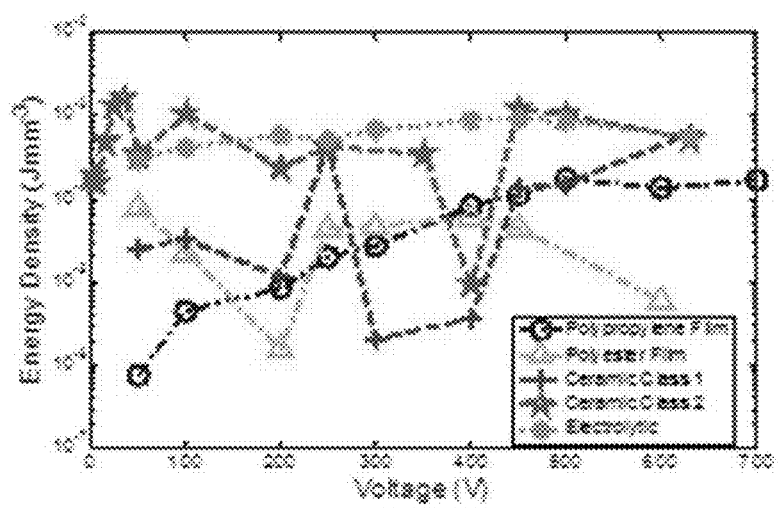
FIG. 10 depicts an example representation of volumetric energy density of five different example types of commercially available capacitors according to one or more implementations.

The optimization methodology presented above maximizes the energy buffering ratio of an SSC energy buffer. The resultant design generally uses capacitors of unequal capacitance values and unequal voltage ratings. This energy buffering ratio optimization would translate into minimization of the passive volume of the SSC energy buffer if capacitors of different voltage ratings had the same energy density. In reality, the volumetric energy density of capacitors is a function of their rated voltage, as shown in FIG. 10. FIG. 10 shows the volumetric energy density of five different example types of commercially available capacitors: film (polypropylene and polyester), ceramic (class 1 and class 2) and electrolytic capacitors. This chart has been developed using data available in manufacturers' datasheets; and for class 2 ceramic capacitors, the nonlinear dependence of their capacitance on applied voltage is taken into account.

The fact that the energy density of capacitors is not independent of rated voltage presents an opportunity to further reduce the passive volume of SSC energy buffers by incorporating this dependence into the optimization process. This optimization may be referred to as volume optimization. The variation in capacitor energy density with rated voltage can be incorporated into this volume optimization process either analytically or numerically, depending on the quality of an analytical fit to the actual capacitor energy density data. Both an analytical and a numerical optimization framework are provided herein.

Analytical Optimization

Figure 11:
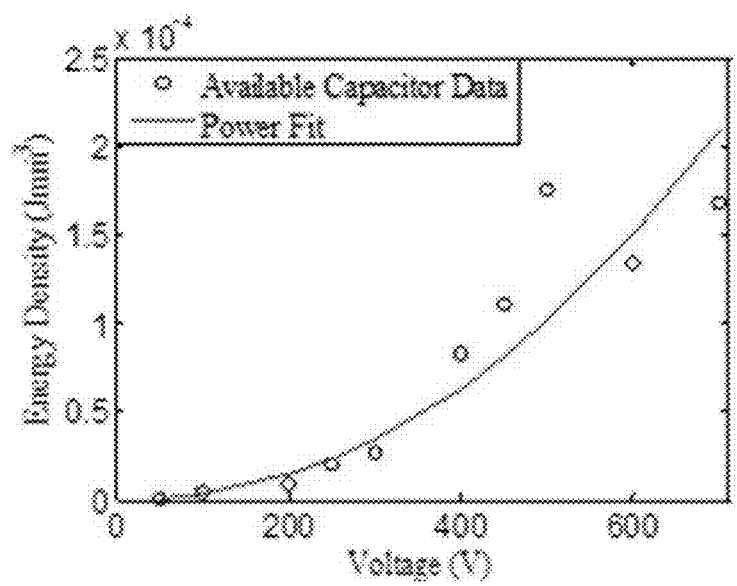
FIG. 11 depicts an example representation of energy density data of commercially available polypropylene film capacitors as a function of their rated voltage.

FIG. 11 shows the energy density data of commercially available polypropylene film capacitors as a function of their rated voltage. This variation in energy density, $W_d$, is well modeled by a power function of the following form:

$$W_d(V_R) = \gamma V_R^\beta \quad (15)$$

where $V_R$ is the rated voltage of the capacitor and $\gamma$ and $\beta$ are fit parameters. For polypropylene film capacitors, $\beta=2.15$ and $\gamma=1.56\times10^{-10}$ J·V$^{-2.15}$/mm$^3$.

The total passive volume of the bipolar SSC energy buffer can be determined from the volume of its individual capacitors. The individual capacitor volume can be computed by dividing the maximum energy that the capacitor has to store by the capacitor's volumetric energy density at its maximum voltage. The maximum energy that the capacitors have to store and their maximum voltages can be determined from (10) and (13) for all the supporting and backbone capacitors, respectively, in terms of the capacitance ratios and the backbone capacitance value $C_{11}$. The maximum voltage on a capacitor can also be used to determine its energy density using (15). Using (10), (13) and (15), the total passive volume of an n-m enhanced bipolar SSC energy buffer may be given by:

$$\mathcal{V} = \frac{nC_{11}}{2\gamma}\left[(1+R_v)V_{nom} + \sum_{j=1}^{m} 2R_v V_{nom}\frac{\alpha_{2j}}{1+\alpha_{2j}}\right]^{2-\beta} + \quad (16)$$

$$\sum_{k=1}^{m} \frac{C_{11}}{2\gamma} \alpha_{2k} \left[ 2R_v V_{nom} + 2R_v V_{nom} \sum_{j=1}^{k-1} \frac{\alpha_{2j}}{1+\alpha_{2j}} \right]^{2-\beta},$$

where $C_{11}$ is the capacitance of each backbone capacitor. The capacitance value of the backbone capacitors depends on the energy needed to be buffered by the SSC energy buffer and its maximum energy buffering capability. The energy needed to be buffered by the energy buffer, $W_b$, can be computed from:

$$W_b = P_{dc}/\omega_{line}$$

where $P_{dc}$ is the maximum dc power of the ac/dc converter for which the energy buffer is being designed and $\omega_{line}$ is the angular frequency of the line (377 rad/sec in the US). The maximum energy that can be buffered ($W_{Ini} - W_{fin}$) can be calculated from (3) and (4). Hence, $C_{11}$ may be given by:

$$C_{11} = \frac{2P_{dc}}{\omega_{line} V_{nom}^2 n R_v \left[ 1 + 2 \sum_{j=1}^{m} \frac{\alpha_{2j}}{(1+\alpha_{2j})} \right]} \quad (17)$$

The expressions corresponding to (10)-(13) for an enhanced unipolar SSC energy buffer are derived in Y. Ni, S. Pervaiz, M. Chen and K. K. Afridi, "Energy Density Enhancement of Unipolar SSC Energy Buffers through Capacitance Ratio Optimization," *IEEE Workshop on Control and Modeling for Power Electronics (COMPEL)*, Santander, Spain, June, 2014, which is incorporated by reference herein in its entirety as if fully set forth herein. These expressions in conjunction with (15) can be used to express the volume of an enhanced unipolar SSC energy buffer in terms of the capacitance ratios of its supporting capacitors:

$$\mathcal{V} = \frac{C_{11}}{2\gamma}[(1+R_v)V_{nom}]^{2-\beta} + \quad (18)$$
$$\sum_{k=1}^{m} \frac{C_{11}}{2\gamma} \alpha_{2k} \left[ 2R_v V_{nom} + 2R_v V_{nom} \sum_{j=2}^{k-1} \frac{\alpha_{2(j-1)}}{1+\alpha_{2(j-1)}} \right]^{2-\beta}.$$

The expressions for the value of $C_{11}$ for an enhanced unipolar SSC energy buffer is given by [12]:

$$C_{11} = \frac{\frac{2P_{dc}}{\omega_{line}}}{V_{C11(ini)}^2 - V_{c11(final)}^2 + \sum_{j=1}^{m} \alpha_{2j}(V_{c2j(ini)}^2 - V_{c2j(final)}^2)}. \quad (19)$$

Figure 12:
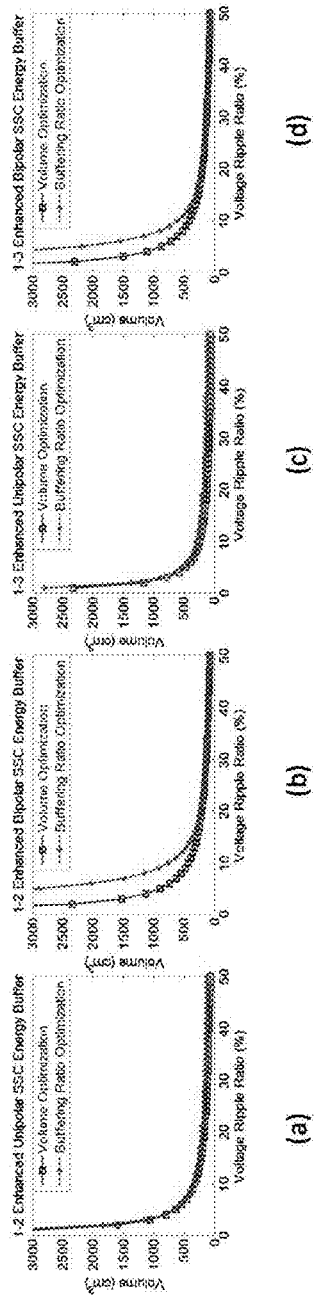
FIG. 12 depicts an example representation of volume optimization for different enhanced unipolar and enhanced bipolar SSC energy buffers, with polypropylene film capacitors according to one or more implementations.

A numerical search algorithm can now be used to find capacitance ratios that minimize the volume of the enhanced bipolar and the enhanced unipolar SSC energy buffers, for a given set of design specifications. Since (16) and (18) incorporate the variation in capacitor energy density with rated voltage, the resultant volume optimization automatically incorporates this dependence. The results of this example volume optimization for different enhanced unipolar and enhanced bipolar SSC energy buffers, with polypropylene film capacitors, are shown in FIG. 12. FIG. 12 compares the passive volumes of these volume-optimized SSC energy buffers with the passive volumes of the same SSC energy buffers when the energy buffering ratio is instead optimized, as described above. Clearly, volume optimization, which incorporates the variation in capacitor energy density with rated voltage, yields less passive volume than energy buffering ratio optimization. This relative decrease in passive volume depends on the required ripple ratio and on the type of SSC energy buffer. For polypropylene film capacitors, the relative decrease in passive volume is the largest in enhanced bipolar SSC buffers at low ripple ratios. For example in a 1-2 enhanced bipolar design with a 10% ripple ratio, a 43% reduction in volume can be achieved with volume optimization relative to energy buffering ratio optimization. This optimization process can be applied to other capacitor types as well, provided their volumetric energy density can be expressed in form of (15).

Numerical Optimization

Figure 13:
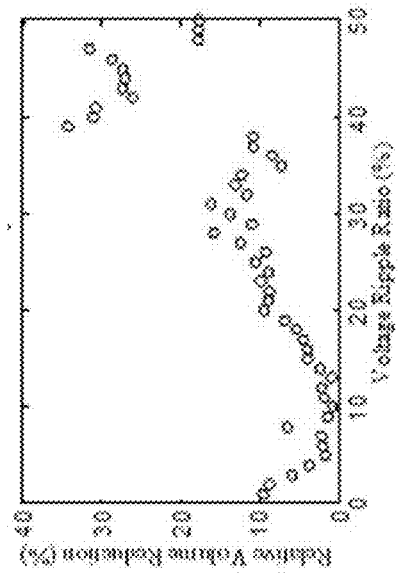
FIG. 13 depicts an example representation of a percentage decrease in passive volume resulting from volume optimization relative to energy buffering ratio optimization according to one or more implementations.

When the energy density versus rated voltage data for a capacitor type cannot be easily expressed analytically, as in the case of ceramic capacitors (see FIG. 10), a direct numerical approach can be adopted. In the numerical approach, individual capacitors from a database of capacitors can be picked and the passive volume of the SSC energy buffer can be minimized using an exhaustive search that considers all the possible designs and chooses the one with minimum volume. Such an algorithm has been developed and applied to a ceramic capacitor based 1-2 enhanced unipolar SSC energy buffer. FIG. 13 shows the percentage decrease in passive volume resulting from this volume optimization relative to energy buffering ratio optimization. Clearly, for a range of ripple ratios, volume optimization results in substantial (up to 35%) reduction in passive volume. It can be observed from FIG. 13 that the relative volume reduction is dependent on the voltage ripple ratio and unlike FIG. 12, relative volume reduction is not monotonic. This is because the volumetric energy density of commercially available ceramic capacitors is non-monotonic with rated voltage.

Example Prototype Design and Experimental Results

Two prototypes of 1-2 enhanced unipolar SSC energy buffer, one with volume optimized capacitance ratios (i.e., taking into account the variation in energy density with capacitor voltage rating) and the other with energy buffering ratio optimized capacitance ratios, were designed, built and tested for an 8-W offline LED driver. The LED driver used for this prototype is an LM3444 LED driver evaluation board with a 120-$V_{rms}$ 60-Hz input and a 21-V output voltage. The prototyped circuit is shown in FIG. 14.

The SSC energy buffer in this example used class-2 ceramics capacitors, and it replaced the two 330-µF/35-V electrolytic capacitors in the LED driver. With these electrolytic capacitors connected, the LED driver had a 2-V peak-to-peak output voltage ripple (i.e., $R_v$=5%). For a 1-2 enhanced unipolar SSC energy buffer with 5% ripple ratio, the optimized capacitance ratios under energy buffering ratio optimization are: $\alpha_{21}$=5.18 and $\alpha_{22}$=2.78; and under volume optimization these optimized capacitance ratios are: $\alpha_{21}$=3.44 and $\alpha_{22}$=2.5. The energy buffering requirement ($P_{dc}/\omega_{line}$) along with the desired capacitance ratios and the achievable energy buffering ratio can be used to compute the values of the three capacitors in the energy buffering ratio optimized and the volume optimized 1-2 enhanced unipolar SSC energy buffers, as shown in Table I. Note that since class 2 ceramic capacitors, whose capacitance varies with applied voltage, are used in this design, the selected capacitance values in Table I (shown as FIG. 15) are different from the values that would have resulted had linear capacitors been used. In this example, these capacitance values are based on the capacitance versus voltage curves provided by the manufacturer.

To validate the volume and energy buffering ratio optimized designs in terms of their performance, the two are simulated in PLECS, as shown in FIG. 16. As expected, both designs maintain the dc bus voltage within the desired 5% voltage ripple range. FIG. 17 shows the experimentally measured dc bus voltage and supporting block voltage ($V_S$) waveforms of the energy buffering ratio optimized and volume optimized 1-2 enhanced unipolar SSC energy buffer. Note that while the dc bus voltage waveforms of the two prototypes are nearly identical and both buffers maintain the dc bus voltage within the required 5% voltage ripple range, the supporting block voltage waveforms are different. This is because the supporting capacitors of the two energy buffers have different maximum and minimum voltages (see Table I presented in FIG. 15).

In this example prototype, the passive volume of the SSC energy buffer was less than half the volume of an electrolytic capacitor it replaced. The reduction in passive volume achieved as a result of volume optimization is the same as predicted by theory. A larger volume reduction is possible if the buffer is designed for a higher or a lower voltage ripple ratio.

Example implementations of improved capacitance ratio optimization methodologies that further reduce the passive volume of SSC energy buffers are provided, such as but not limited to by taking into account the variation in energy density of commercially available film and ceramic capacitors with rated voltage. Substantial volume reductions are achievable in bipolar and unipolar designs depending on the desired ripple ratios, the type of capacitors used and the type of SSC energy buffer. Volume optimization in one example may result in up to 43% volume reduction for polypropylene film capacitor based SSC energy buffers, while for ceramic capacitor based SSC energy buffers up to 35% volume reduction may also be achieved. As described above, an optimization methodology was validated using a ceramic capacitor based 1-2 enhanced unipolar SSC energy buffer designed for an 8-W offline LED driver.

Energy Buffer

In another implementation, an SSC energy buffer design that has very high effective energy density, and is suitable for single-phase single-stage ac/dc converters, such as offline LED drivers is provided. In this implementation, compared to earlier SSC implementations, the design also includes a simpler ground-referenced gate drives and eliminates the need for a separate precharge circuit. An improvement in energy density may be achieved in part by a design approach that optimizes the ratio of the capacitance values of the capacitors in the SSC energy buffer. In one implementation, for example, an SSC energy buffer may achieve a round-trip efficiency of above 98%, and the total passive volume of ceramic capacitors is less than half the volume of electrolytic capacitors it may replace.

Figure 27:
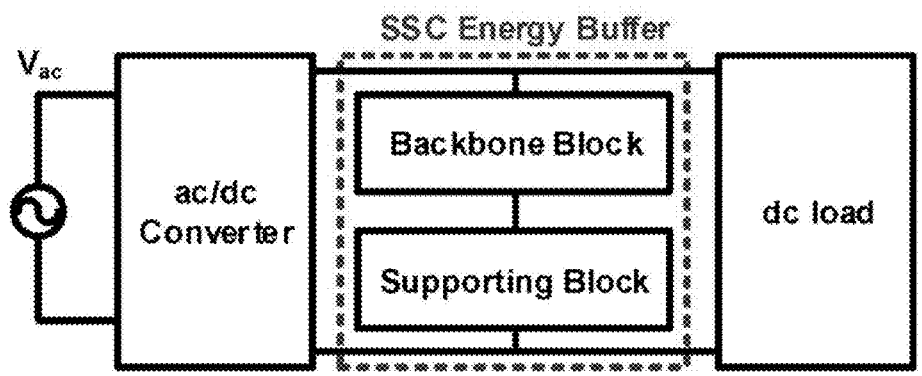
FIG. 27 depicts an example an SSC energy buffer including two series-connected blocks of switches and capacitors: a backbone block and a supporting block according to one or more implementations.

In one implementation, an SSC energy buffer comprises two series-connected blocks of switches and capacitors: a backbone block and a supporting block, as shown in FIG. 27. In this implementation, the circuit works on the principle that while the voltages across the individual blocks (and individual capacitors) vary over a wide range, these voltage variations of the two blocks tend to cancel each other. Therefore, the dc bus voltage is maintained within a desired narrow range. By allowing large variations in individual capacitor voltages, the SSC energy buffer significantly improves the utilization of the energy stored in the capacitors. This increases the effective energy density of the energy buffer. Furthermore, the switches in the SSC energy buffer switch at low multiples of the line frequency, minimizing switching losses. This allows the energy buffer to have a high round-trip efficiency.

The SSC energy buffer may have many implementations, allowing tradeoffs to be made between performance and complexity. Among these implementations is an 1-m enhanced unipolar SSC energy buffer, such as described above. In this implementation, the circuit has one backbone capacitor, m supporting capacitors and (m+1) supporting block switches. Because of its relatively low complexity and reasonably high energy utilization, it is suitable for offline single-stage LED drivers.

Figure 28:
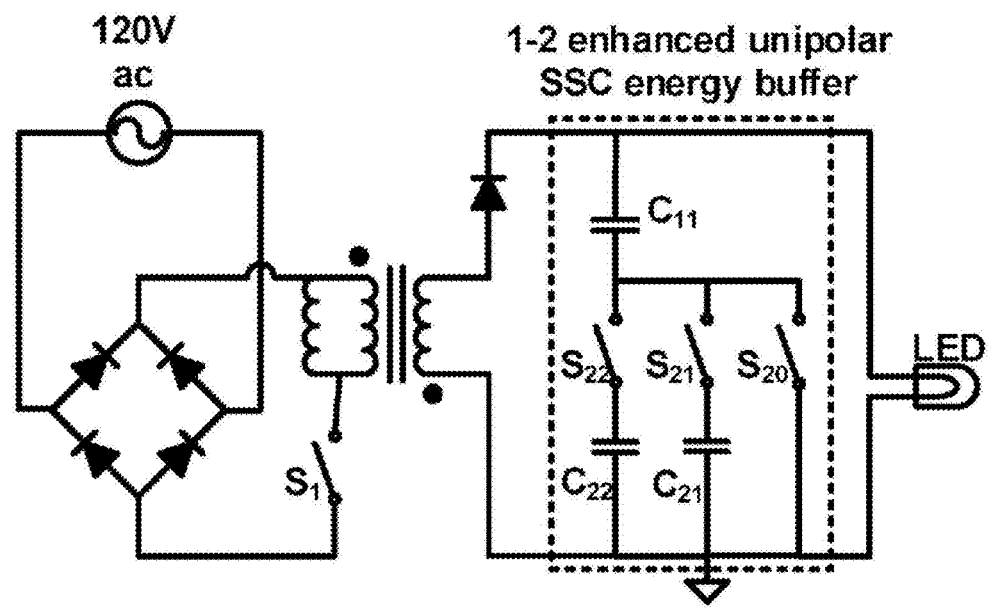
FIG. 28 depicts an example schematic of a 1-2 enhanced unipolar SSC energy buffer as part of an offline single-stage LED driver according to one or more implementations.

FIG. 28 shows the schematic of an example 1-2 enhanced unipolar SSC energy buffer as part of an offline single-stage LED driver. In this implementation, the LED driver shown in FIG. 28 is a flyback converter, and the SSC energy buffer replaces electrolytic capacitors that would otherwise be at the output of this converter. The LED driver used in this example may have, for example, a nominal output voltage of 21 V and a peak-to-peak ripple of 2 V.

Before the buffer starts normal operation, the capacitors are precharged to appropriate voltage levels through a specific precharge switching sequence. In one example implementation of an 1-2 enhanced unipolar SSC energy buffer, the voltage of $C_{11}$, $VC_{11}$, may be precharged to 18 V, the voltage of $C_{21}$, $VC_{21}$, may be precharged to 1 V, and the voltage of $C_{22}$, $VC_{22}$, may be precharged to 2 V. When precharging starts, $S_{21}$ and $S_{22}$ are both turned on to charge $C_{21}$ and $C_{22}$ to 1 V. After this, $S_{21}$ is turned off, and $S_{22}$ is kept on to continue charging $C_{22}$. When $VC_{22}$ reaches 2 V, $S_{22}$ is turned off and $S_{20}$ is turned on to charge $C_{11}$. Once $VC_{11}$ reaches 18 V in this particular implementations, the precharge stage is completed and the SSC energy buffer enters normal operation.

Figure 29:
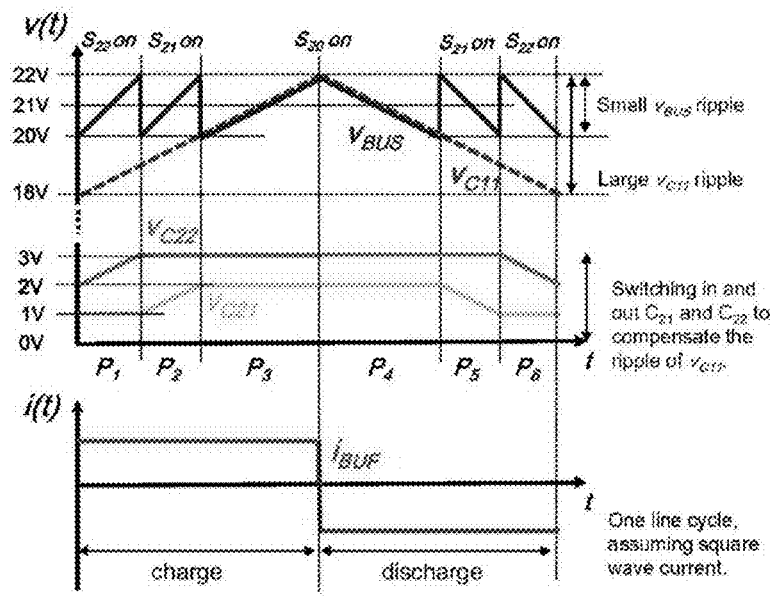
FIG. 29 depicts an example graphical representation of the main waveforms of the 1-2 enhanced unipolar SSC energy buffer during normal operation according to one or more implementations.

FIG. 29 shows an example graphical representation of the main waveforms of the 1-2 enhanced unipolar SSC energy buffer during normal operation. In this implementation, in each switching cycle there is a symmetrical charging and discharging process. The charging process in this implementation of the SSC buffer can be divided into the following three intervals:

1) $P_1$—charging $C_{11}$ and $C_{22}$: when the energy buffer is to be charged, $S_{22}$ is turned on (and all the other switches are off). $C_{11}$ and $C_{22}$ are charged during this period, and $C_{21}$ is not connected. When the dc bus voltage, $V_{BUS}$, reaches, for example, 22 V, $VC_{11}$ becomes, for example, 19V. Then $S_{22}$ is turned off and $S_{21}$ is turned on. $VC_{21}$ (e.g., 1 V) adds to $VC_{11}$ (e.g., 19V) and elevates $V_{BUS}$ back to 20 V.

2) $P_2$—charging $C_{11}$ and $C_{21}$: During this period, $S_{21}$ is on. $C_{11}$ and $C_{21}$ are charged in series until $V_{BUS}$ reaches a target (e.g., 22 V) again. This time $VC_{11}$ becomes 20 V, and $VC_{21}$ increases to 2 V. Then $S_{21}$ is turned off, and $S_{20}$ is turned on. In this particular example, the dc bus voltage equals the voltage of C11 (e.g., 20 V).

3) $P_3$—charging $C_{11}$ only: During this period, only $S_{20}$ is on. $C_{11}$ is charged until $V_{BUS}$ reaches a target (e.g., 22 V).

At this time, in this example, all capacitors have reached their maximum voltage (e.g., $VC_{11}$=22 V, $VC_{21}$=2 V and $VC_{22}$=3 V). In this implementation, the SSC energy buffer is not further charged. As a result, for a given maximum power of the ac-dc converter, the size of the capacitors needs to be large enough to ensure this charging limit is never exceeded.

The discharging process ($P_4$ to $P_6$) may simply be the reverse of the charging process.

In one implementation, design parameters for an SSC energy buffer may be a voltage ripple ratio (Rv) and an energy buffering ratio ($\Gamma_b$). The voltage ripple ratio is defined as the ratio of the peak voltage ripple amplitude (half of peak-to-peak ripple) to the nominal value of the dc bus voltage. The energy buffering ratio is defined as the ratio of the energy that can be injected and extracted from an energy buffer in one cycle to the total energy capacity of the buffer. Maximizing the energy buffering ratio for a given voltage ripple ratio may ensure better usage of a given amount of capacitor energy storage capacity. The energy buffering ratio for a 1-m enhanced unipolar SSC energy buffer (with all capacitors having equal capacitance) as a function of voltage ripple ratio (Rv) and number of supporting capacitors (m) is given by the following:

$$\Gamma_b = 1 - \frac{(1 + 2^2 + 3^2 + \ldots + m^2)R_v^2 + (1 - (m+1)R_v)^2}{(2^2 + 3^2 + \ldots + (m+1)^2)R_v^2 + (1 + R_v)^2}. \quad (33)$$

Figure 30:
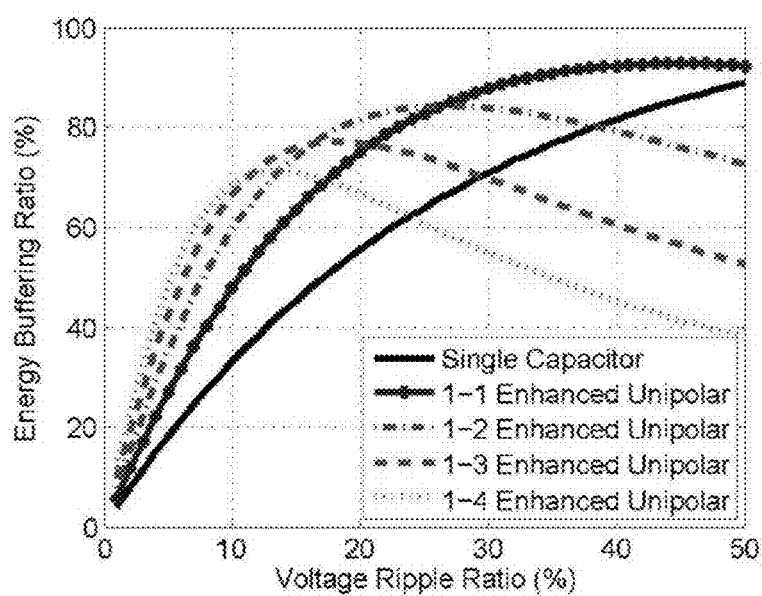
FIG. 30 depicts an example graph showing energy buffering ratio plotted as a function of ripple ratio according to one or more implementations.

This expression for energy buffering ratio is plotted as a function of ripple ratio in FIG. 30 for four different values of the number of supporting capacitors (m). From FIG. 30 it can be seen that the 1-2 enhanced unipolar SSC energy buffer provides a good tradeoff between energy density and circuit complexity (which increases with increasing m). Therefore, in one implementation it may be selected as the topology of choice for an implementation.

Conventional SSC designs use capacitors of equal capacitance value. However, further improvements (as described herein) in energy buffering ratio are possible if the capacitance ratios of these capacitors are optimized. For example, an energy buffering ratio for a 1-2 enhanced unipolar SSC energy buffer with arbitrary capacitance values for the three capacitors ($C_{11}$, $C_{21}$ and $C_{22}$) may be given by:

$$\Gamma_b = 1 - \frac{\left[1 - R_v - 2R_v\left(\frac{\alpha_{21}}{1+\alpha_{21}} + \frac{\alpha_{22}}{1+\alpha_{22}}\right)\right]^2}{(1+R_v)^2 + 4\alpha_{22}R_v^2\left[1 + \frac{\alpha_{21}}{1+\alpha_{21}}\right]^2 + 4\alpha_{21}R_v^2} - $$

$$\frac{4\alpha_{22}R_v^2\left[\frac{\alpha_{21}}{1+\alpha_{21}} + \frac{\alpha_{22}}{1+\alpha_{22}}\right]^2}{(1+R_v)^2 + 4\alpha_{22}R_v^2\left[1 + \frac{\alpha_{21}}{1+\alpha_{21}}\right]^2 + 4\alpha_{21}R_v^2} - $$

$$\frac{4\alpha_{21}R_v^2\left[\frac{\alpha_{21}}{1+\alpha_{21}}\right]^2}{(1+R_v)^2 + 4\alpha_{22}R_v^2\left[1 + \frac{\alpha_{21}}{1+\alpha_{21}}\right]^2 + 4\alpha_{21}R_v^2}. \quad (34)$$

Here $\alpha_{21} = C_{21}/C_{11}$ and $\alpha_{22} = C_{22}/C_{11}$ are the ratios of the capacitances of the two supporting capacitors to the capacitance of the backbone capacitor. When the three capacitors have equal capacitances (e.g., $\alpha_{21} = \alpha_{22} = 1$), this expression reduces to the expression given in (33) with m=2.

Figure 32:
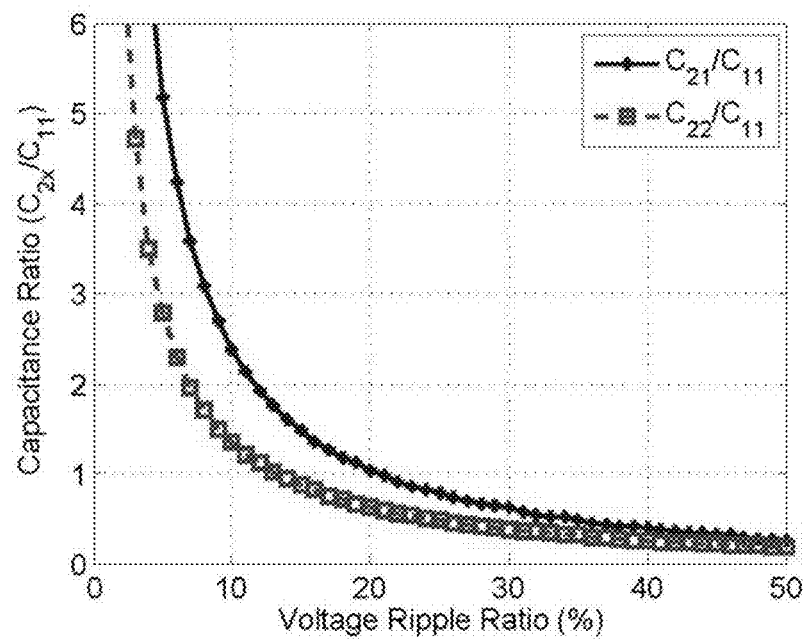
FIG. 32 depicts an example graph showing optimal values of capacitance ratios that maximize an energy buffering ratio plotted as a function of ripple ratio according to one or more implementations.
Figure 33:
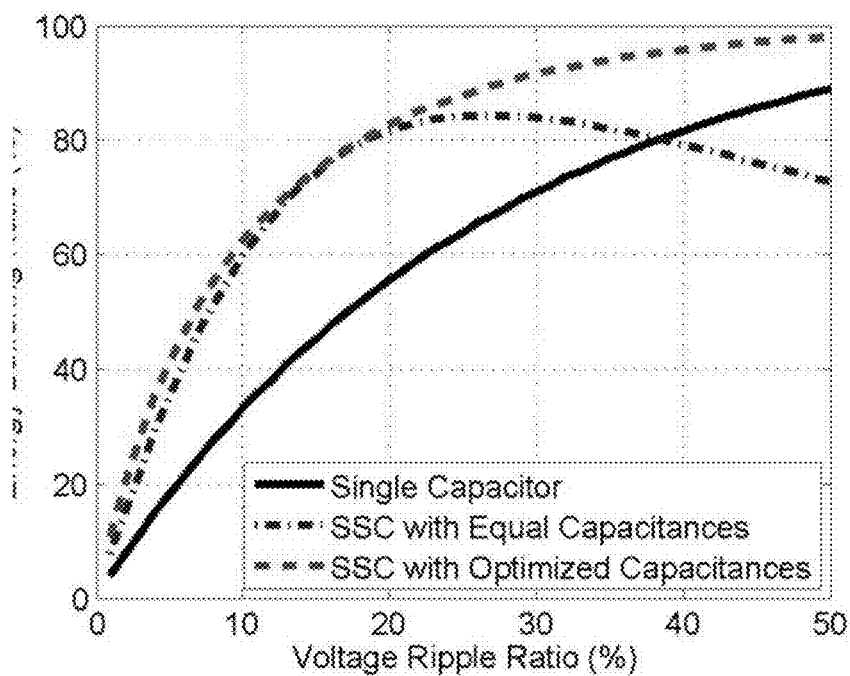
FIG. 33 depicts an example graph showing an improvement in energy buffering ratio plotted as a function of ripple ratio relative to using capacitors of equal capacitance according to one or more implementations.

FIG. 31 plots the energy buffering ratio of the 1-2 enhanced unipolar SSC energy buffer as a function of $\alpha_{21}$ and $\alpha_{22}$ for three different values of ripple ratio ($R_v = 5\%$, $R_v = 15\%$, $R_v = 30\%$). As can be seen from FIG. 31, the optimal capacitance ratios (i.e. $C_{21}/C_{11}$ and $C_{22}/C_{11}$) depend on the ripple ratio. The optimal values of $C_{21}/C_{11}$ and $C_{22}/C_{11}$ which maximize the energy buffering ratio are plotted as a function of ripple ratio in FIG. 32. Note that in this particular implementation, across the full range of ripple ratios considered, an optimal design uses a larger capacitance value for $C_{21}$ (the supporting capacitor with the lower voltage) than $C_{22}$. Also, as the voltage ripple ratio increases, the capacitance values for both $C_{21}$ and $C_{22}$ decrease relative to $C_{11}$. The improvement in energy buffering ratio because of this optimization (relative to using capacitors of equal capacitance) are plotted in FIG. 33. The optimization is most beneficial at low and high ripple ratios. This is because if the ripple ratio is in the 15-20% range, the optimal capacitance ratios are quite close to unity.

Figure 35:
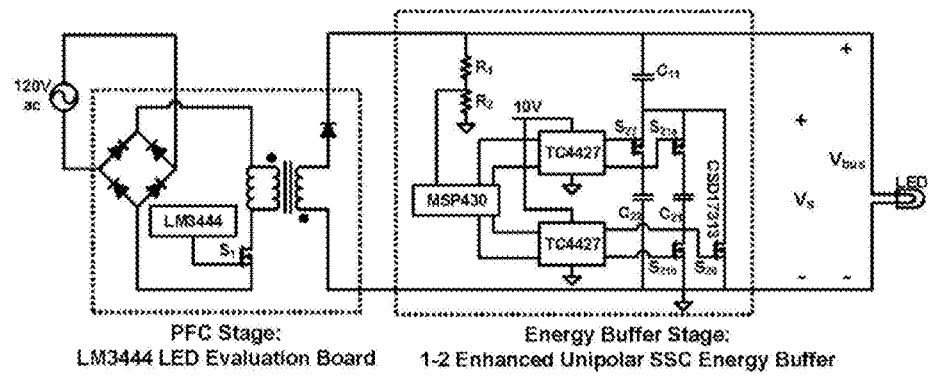
FIG. 35 depicts an example schematic of a prototype comprising a flyback converter and an SSC energy buffer according to one or more implementations.

A prototype ceramic-capacitor-based 1-2 enhanced unipolar SSC energy buffer has been designed and built as part of an offline LED driver. Compared to previous implementations, this design places specific emphasis on demonstrating the reduced size of the energy buffer. An LM3444 120-Vac 8-W LED driver evaluation board is used as the design platform for this prototype. The evaluation board has a flyback converter functioning as the grid-tied power factor correction circuit (PFC), and uses two 330_F/35 V electrolytic capacitors for twice-line-frequency energy buffering. In this example, these capacitors are replaced by a 1-2 enhanced SSC energy buffer. FIG. 35 shows the full schematic of the prototype comprising the flyback converter and the SSC energy buffer.

In this implementation, the nominal output voltage of the LED driver is 21 V with 2 V peak-to-peak voltage ripple (i.e., Rv=5%) when the output power is 8 W. From FIG. 33, the optimized capacitance ratios for a ripple ratio (Rv) of 5% are: $\alpha_{21} = 5:18$ and $\alpha_{22} = 2:78$. Table III (shown in FIG. 34) lists the example optimized capacitance values and voltage ratings for the three capacitors ($C_{11}$, $C_{21}$ and $C_{22}$) of the SSC energy buffer. Also listed in Table III are example design values for the SSC energy buffer when equal capacitances are used, and the design values for a single capacitor solution. The total energy storage capacities of these three alternative designs are also given in Table III. In this implementation, the SSC energy buffer with optimized capacitance ratios requires the least energy storage capacity, reflecting its high energy buffering ratio compared to the alternative designs. The values in Table III assume linear capacitors. In practice, the capacitance of ceramic capacitors has a nonlinear dependence on voltage. For this reason the actual capacitance values used are somewhat higher.

In this particular example, the maximum drain-to-source voltages of switches $S_{21}$, $S_{22}$ and $S_{20}$ (in FIG. 28) are 1.00 V, 3.72 V and 3.72 V, respectively. $S_{21}$ blocks bidirectional voltage, and in this implementation is implemented with two reverse connected MOSFETs ($S_{21a}$ and $S_{21b}$), as shown in FIG. 35. All switches are designed to carry bidirectional current. The rms currents of $S_{21a}$, $S_{21b}$, $S_{22}$, $S_{20}$ at full load in this implementation are: 0.17 A, 0.17 A, 0.13 A, 0.16 A, respectively. In the prototype, all switches are implemented with CSD17313Q2 MOSFETs. The four switches are driven by two TC4427 two channel gate drives. Since the supporting block voltage ($v_s$) never exceeds 3 V, no floating gate drive is required for $S_{21a}$ and $S_{22}$. The grid-tied flyback converter is controlled by a LM3444 controller, and the SSC energy buffer is controlled by a MSP430 microcontroller. The microcontroller senses the dc bus voltage through a resistive voltage divider and produces the four required gate signals. In this prototype, the total volume of the two electrolytic capacitors is 2010 mm³, while the total volume of the ceramic capacitors in the SSC energy buffer is 975 mm³. The majority of the area of the SSC energy buffer board area in this implementation is occupied by $C_{11}$, $C_{21}$ and $C_{22}$. The board area occupied by the control and gate drive circuits is much smaller and can be further reduced by implementing these as custom integrated circuit(s).

Even with all the other circuit elements included, the displaced volume of the SSC energy buffer in this example is not more than the volume of the electrolytic capacitors it replaces; and this volume can be reduced further by taking advantage of the rapid miniaturization and integration trends in semiconductor technology. The SSC-to-electrolytic capacitors passive volume ratio achieved by this prototype is a factor of four better than previously reported results.

Figure 36:
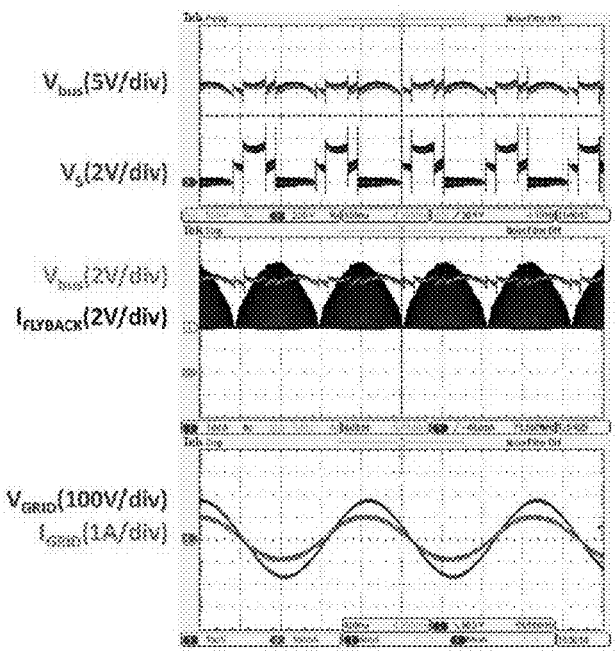
FIG. 36 depicts example experimental waveforms of a prototype SSC energy buffer operating as the twice-line-frequency energy buffer for an offline LED driver according to one or more implementations.

FIG. 36 shows example experimental waveforms of the prototype ceramic-capacitor-based SSC energy buffer operating as the twice-line-frequency energy buffer for an offline 8-W 21-V output LED driver. As can be seen the output dc bus voltage ($v_{bus}$) is maintained within the required ±5% ripple range (±1 V), even though the individual block voltages vary across a much wider range. The voltage at the switch node ($v_s$) compensates the variations in the voltage across the backbone capacitor $C_{11}$, resulting in the small ripple on the dc bus.

FIG. 36 also shows the grid side voltage $v_{GRID}$ and current $i_{GRID}$. The replacement of the electrolytic capacitor with the SSC energy buffer has no impact on the grid side power factor and THD, which are determined by the PFC stage. The round-trip efficiency of the prototype SSC energy buffer in this example was measured to be 98.2%. A high efficiency is achieved through the use of low ESR ceramic capacitors. Also because the switches in the SSC energy buffer switch at low multiples of the line frequency, the switching losses are very low.

Appendix A to the '109 provisional patent application entitled "Energy Density Enhancement of Unipolar SSC Energy Buffers through Capacitance Ratio Optimization" written by Yu Ni et al. further demonstrates a method for optimizing capacitance ratios in an example enhanced unipolar SSC energy buffer circuit using an example prototype 1-2 enhanced unipolar SSC energy buffer designed for an 8-W offline LED driver.

Appendix B to the '109 provisional patent application entitled "Improved Capacitance Ratio Optimization Methodology for Stacked Switched Capacitor Energy Buffers" also further demonstrates a method for optimizing capacitance ratios in an example enhanced bipolar SSC energy buffer circuit.

Appendix C to the '109 provisional patent application entitled "Design of Stacked Switched Capacitor Energy Buffers for Offline LED Drivers" is a thesis submitted for an SSC energy buffer circuit designed for use with offline LED drivers, although as described below, circuits, components, methodologies, designs and other information may be useful within any other application interfacing AC and DC applications.

Appendix D to the '109 provisional patent application entitled "An Electrolytic-Free Offline LED Driver with a Ceramic-Capacitor-Based Compact Stacked Switched Capacitor (SSC) Energy Buffer" written by Saad Pervaiz et al. is a further demonstration of a ceramic capacitor based stacked switch capacitor (SSC) energy buffer that replaces limited life electrolytic capacitors used for twice line frequency in an offline LED driver.

Appendix E to the '109 provisional patent application entitled "An Electrolytic-Free Offline LED Driver with a Ceramic-Capacitor-Based Compact SSC Energy Buffer" is a digest presenting a design and implementation of a compact ceramic-capacitor-based stacked switch capacitor energy buffer for a single stage electrolytic-free LED driver.

Appendix F to the '109 provisional patent application entitled "An Electrolytic-Free Offline LED Driver with a Ceramic-Capacitor-Based Compact SSC Energy Buffer" written by Minjie Chen et al. is a paper presenting a design and implementation of a compact ceramic-capacitor-based stacked switch capacitor energy buffer for a single stage electrolytic-free LED driver.

Each of the Appendices A-F filed with U.S. provisional patent application No. 62/050,109, filed 13 Sep. 2014 are incorporated herein as part of the provisional application relied upon herein in their entirety for all they teach and suggest, individually and collectively, as if fully set forth herein. The implementations described herein, including in the appendices and in PCT applications PCT/US13/21926 entitled "STACKED SWITCHED CAPACITOR ENERGY BUFFER CIRCUIT ARCHITECTURE", PCT/US13/22001 entitled "ENHANCED STACKED SWITCHED CAPACITOR ENERGY BUFFER CIRCUIT" and PCT/US13/24552 entitled "SYSTEMS APPROACH TO PHOTOVOLTAIC ENERGY EXTRACTION (also incorporated by reference), may be used as an energy buffer in any application interfacing direct current (DC) and single-phase alternating current (AC) to provide an energy storage capability (or an energy buffer), including but not limited to those applications described in any of the provisional application Appendices or the PCT applications incorporated by reference.

Although various implementations of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

The foregoing and other aspects, features, details, utilities, and advantages of the present invention will be apparent from reading the attached Appendices and PCT applications incorporated by reference as well as the following claims, and from reviewing the accompanying drawings.

What is claimed is:

1. A stacked switched capacitor (SSC) energy buffer circuit comprising:
    two sub-circuits that are serially coupled during a first operating mode wherein each sub-circuit comprises one or more capacitors and at least one sub-circuit further comprises a plurality of switches disposed to selectively couple the capacitors to:
        (a) enable dynamic reconfiguration of how the capacitors are coupled to the terminals of the sub-circuit; and
        (b) dynamically reconfigure the interconnection among the capacitors within the sub-circuit,
    wherein at least one of (i) at least two of the capacitors of the two sub-circuits have capacitance values related by a ratio determined based upon a desired voltage ripple ratio and (ii) at least one of the plurality of switches is driven by a ground reference drive signal.

2. The SSC energy buffer circuit of claim 1 wherein the capacitance ratios are related by a value, a, determined based upon at least one of the group comprising: a chart, an equation and a chart and/or equation as a function of a predetermined voltage ripple ratio of an SSC energy buffer circuit.

3. The SSC energy buffer circuit of claim 1 wherein each of the capacitors of a first sub-circuit has the capacitance ratio with respect to at least one capacitor of a second sub-circuit of the SSC energy buffer circuit.

4. The SSC energy buffer circuit of claim 3 wherein the first sub-circuit comprises a supporting block of the SSC energy buffer circuit and the second sub-circuit comprises a backbone block of the SSC energy buffer circuit.

5. The SSC energy buffer circuit of claim 3 wherein the first sub-circuit comprises a backbone block of the SSC energy buffer circuit and the second sub-circuit comprises a supporting block of the SSC energy buffer circuit.

6. The SSC energy buffer circuit of claim 1 wherein the switches in at least one of the two sub-circuits are arranged to dynamically reconfigure a polarity with which at least one capacitor is connected to the terminals of the sub-circuit.

7. The SSC energy buffer circuit of claim 1, further comprising a pre-charge circuit coupled to each of the two sub-circuits said pre-charge circuit operable to charge each of the one or more capacitors in the two sub-circuits to specified initial conditions before entering the first operating mode.

8. The SSC energy buffer circuit of claim 1 wherein at least one sub-circuit comprises a plurality of sub-sub-circuits connected in parallel, wherein each sub-sub-circuit comprises a switch serially coupled to a capacitor.

9. The SSC energy buffer circuit of claim 1 wherein the switches are disposed to selectively couple the capacitors to enable dynamic reconfiguration of both the interconnection among the capacitors and their connection to a buffer port.

10. The SSC energy buffer circuit of claim 1 wherein the switches are cooperatively operated as a switching network such that the voltage seen at a buffer port varies only over a small range as the capacitors charge and discharge over a wide voltage range to buffer energy.

11. A circuit comprising;
a first set of circuitry comprising:
    m capacitors; and
    m switches, each m switch serially coupled to a corresponding one of the m capacitors; and
a second set of circuitry comprising:
    n capacitors; and
    n switches, each n switch serially coupled to a corresponding one of the n capacitors;
wherein a voltage across the first set of circuitry and the second set of circuitry is a bus voltage,
wherein the circuit is configured to maintain the bus voltage within a predetermined range of a nominal value,
wherein n and m are integers greater than zero, and
wherein at least one of (i) at least two of the capacitors of the two sub-circuits have capacitance values related by a ratio determined based upon a desired voltage ripple ratio and (ii) at least one of the m switches is driven by a ground reference drive signal and at least one of the n switches is driven by a ground reference drive signal.

12. The SSC energy buffer circuit of claim 11 wherein the capacitance ratios are related by a value, a, determined based upon at least one of the group comprising: a chart, an equation and a chart and/or equation as a function of a predetermined voltage ripple ratio of an SSC energy buffer circuit.

13. The SSC energy buffer circuit of claim 11 wherein each of the m capacitors of the first set of circuitry has the capacitance ratio with respect to at least one of the n capacitors of the second set of circuitry of the SSC energy buffer circuit.

14. The SSC energy buffer circuit of claim 13 wherein the first set of circuitry comprises a supporting block of the SSC energy buffer circuit and the second set of circuitry comprises a backbone block of the SSC energy buffer circuit.

15. The SSC energy buffer circuit of claim 13 wherein the first set of circuitry comprises a backbone block of the SSC energy buffer circuit and the second set of circuitry comprises a supporting block of the SSC energy buffer circuit.

16. The SSC energy buffer circuit of claim 11 wherein the first set of circuitry includes an H-bridge switch and wherein said H-bridge switch is disposed to allow at least some of said m capacitors to be charged in a bipolar fashion.

17. The SSC energy buffer circuit of claim 1 wherein the ground reference drive signal is generated by a ground reference gate driver circuit coupled to a gate or base of at least one of the plurality of switches and wherein the at least one of the plurality of switches comprises at least one of a MOSFET and a bipolar junction transistor (BJT).

18. A stacked switched capacitor (SSC) energy buffer circuit comprising:
two sub-circuits that are serially coupled during a first operating mode wherein each sub-circuit comprises one or more capacitors and at least one sub-circuit further comprises a plurality of switches disposed to selectively couple the capacitors to:
    (a) pre-charge the one or more capacitors prior to normal operating conditions;
    (b) enable dynamic reconfiguration of how the capacitors are coupled to the terminals of the sub-circuit; and
    (c) dynamically reconfigure the interconnection among the capacitors within the sub-circuit,
    wherein the plurality of switches pre-charge the one or more capacitors without a separate pre-charge circuit.

19. The SSC energy buffer circuit of claim 18 wherein a microcontroller is adapted to control the plurality of switches to selectively couple the capacitors to:
    (a) pre-charge the one or more capacitors prior to normal operating conditions;
    (b) enable dynamic reconfiguration of how the capacitors are coupled to the terminals of the sub-circuit; and
    (c) dynamically reconfigure the interconnection among the capacitors within the sub-circuit.

20. A circuit comprising;
a first set of circuitry comprising:
    m capacitors; and
    m switches, each m switch serially coupled to a corresponding one of the m capacitors, wherein a microcontroller is adapted to control at least one of the m switches to pre-charge at least one of the m capacitors without a separate pre-charge circuit; and
a second set of circuitry comprising:
    n capacitors; and
    n switches, each n switch serially coupled to a corresponding one of the n capacitors, wherein a microcontroller is adapted to control at least one of the n switches to pre-charge at least one of the n capacitors without a separate pre-charge circuit;

wherein the first set of circuitry and the second set of circuitry are serially coupled during a first operating mode, wherein a voltage across the first set of circuitry and the second set of circuitry is a bus voltage, wherein the circuit is configured to maintain the bus voltage within a predetermined range of a nominal value, wherein n and m are integers greater than zero.

21. The SSC energy buffer circuit of claim 1 wherein the capacitance values of the at least two capacitors of the two sub-circuits have unequal capacitance values.

* * * * *